(12) United States Patent
Bacon

(10) Patent No.: US 11,563,455 B1
(45) Date of Patent: Jan. 24, 2023

(54) POWER SPECTRAL DENSITY POWER DETECTOR

(71) Applicant: pSemi Corporation, San Diego, CA (US)

(72) Inventor: Peter Bacon, Derry, NH (US)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 17/550,824

(22) Filed: Dec. 14, 2021

(51) Int. Cl.
| | |
|---|---|
| H04M 1/00 | (2006.01) |
| H04B 1/10 | (2006.01) |
| H04B 1/12 | (2006.01) |
| H04B 1/16 | (2006.01) |

(52) U.S. Cl.
CPC ............. *H04B 1/1036* (2013.01); *H04B 1/12* (2013.01); *H04B 1/163* (2013.01); *H04B 2001/1063* (2013.01)

(58) Field of Classification Search
CPC .......... H04B 1/1036; H04B 1/10; H04B 1/12; H04B 2001/1063; H04B 1/163
See application file for complete search history.

(56) References Cited

U.S. PATENT DOCUMENTS

| | | | | |
|---|---|---|---|---|
| 8,022,734 | B1 | 9/2011 | Broughton | |
| 9,071,430 | B2 * | 6/2015 | Bauder | H04B 1/525 |
| 9,134,355 | B2 * | 9/2015 | Basawapatna | G01R 23/165 |
| 9,245,158 | B2 * | 1/2016 | Gudan | G06K 7/10207 |
| 10,164,756 | B2 * | 12/2018 | Baker | H04L 25/025 |

OTHER PUBLICATIONS

IITH, CEWiT, IITM, Tejas Networks, "Comparison of pi/2 BPSK with and without Frequency Domain Pulse Shaping: Results with PA mode", document R1-1700849 presented at the 3GPP TSG RAN WG1 AH_NR Meeting in Spokane, Washington, USA Jan. 16-20, 2017.
Kourani, et al., "A 300-500 MHz Tunable Oscillator Exploiting Ten Overtones in Single Lithium Niobate Resonator", Department of Electrical and Computer Engineering, University of Illinois at Urbana-Chamgaign, May 2019, 4 pgs.
Salim, et al., "A Novel Frequency Tunable RF Comb Filter", IEEE Microwave and Wireless Components Letters, vol. 30, No. 12, Dec. 2020, pp. 1133-1136.

(Continued)

*Primary Examiner* — Nhan T Le
(74) *Attorney, Agent, or Firm* — Jaquez Land Greenhaus & McFarland LLP; John Land, Esq.

(57) ABSTRACT

Circuits and methods that provide fine-resolution measurements of RF signal power within a communication system band, thereby more accurately measuring RF interference or the potential of RF interference. One aspect of embodiments of the present invention is a narrow-band tunable filter that includes two elements coupled in series, a periodic passband filter and a tunable filter. The purpose of the periodic passband filter is to generate multiple periodic passbands for an applied RF signal. The purpose of the tunable filter is to generate a single passband, generally with a tunable center frequency. By serially coupling the two filter types in either order, the single passband of the tunable filter is superimposed over one of the periodic passbands of the periodic passband filter, synergistically resulting in an extremely narrow passband.

25 Claims, 15 Drawing Sheets

(56) References Cited

OTHER PUBLICATIONS

Khan, et al., "Low PAPR Reference Signal Transceiver Design for 3GPP 5G NR Uplink", EURASIP Journal on Wireless Communications and Networking, (2020) 2020:182, 28 pgs.

Lu, et al., "RF Filters with Periodic Passbands for Sparse Fourier Transform-Based Spectrum Sensing", Journal of Microelectromechanical Systems, vol. 27, No. 5, Oct. 2018, pp. 931-944.

* cited by examiner

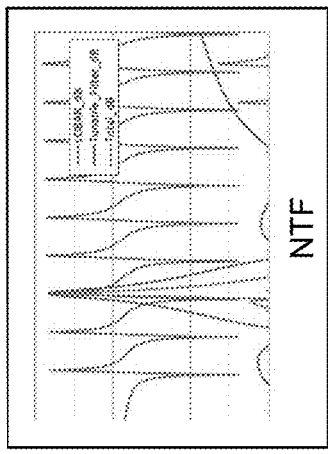 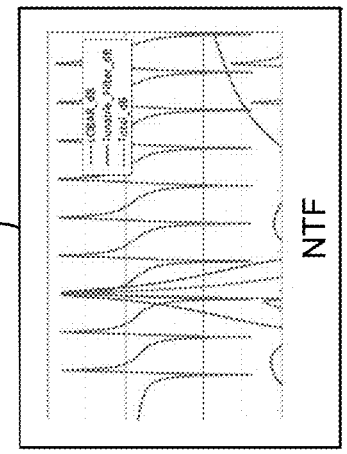
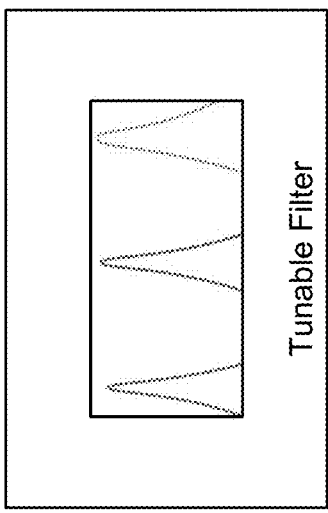 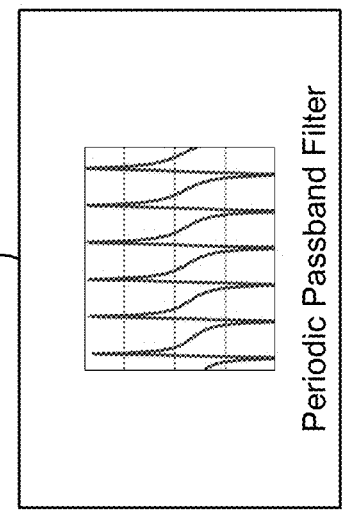
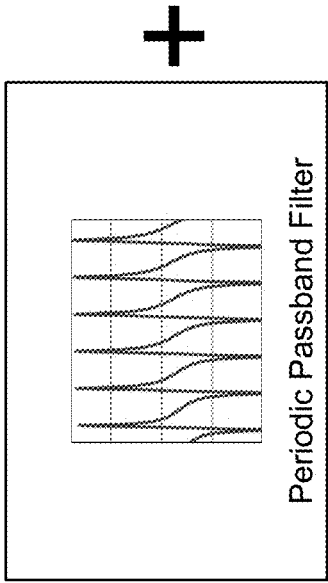 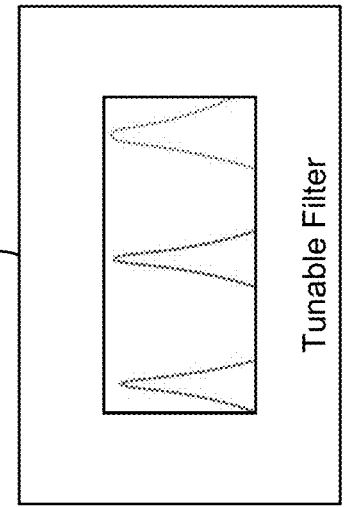
FIG. 4A
FIG. 4B

POWER SPECTRAL DENSITY POWER DETECTOR

BACKGROUND

(1) Technical Field

This invention relates to electronic circuits, and more particularly to radio frequency electronic circuits and related methods.

(2) Background

Many modern electronic systems include radio frequency (RF) transceivers; examples include cellular telephones, personal computers, tablet computers, wireless network components, televisions, cable system "set top" boxes, automobile communication systems, wireless sensing devices, and radar systems. Many RF transceivers are two-way capable of transmitting and receiving in duplex or half-duplex modes across multiple frequencies in multiple bands; for instance, in the United States, the 2.4 GHz band is divided into 14 channels spaced about 5 MHz apart. As another example, a modern "smart telephone" may include RF transceiver circuitry capable of concurrently operating on different cellular communications systems (e.g., GSM, CDMA, LTE, and 5G in multiple bands within, for example, the 600-6000 MHz range and in millimeter wave frequencies), on different wireless network frequencies and protocols (e.g., various IEEE 802.11 "WiFi" protocols at 2.4 GHz, 5 GHz, and 6 GHz), and on "personal" area networks (e.g., Bluetooth based systems).

A frequency division duplex radio system generally operates in one radio frequency (RF) band for transmitting RF signals and a separate RF band for receiving RF signals. A time division duplex radio system operates in a single RF band and frequently switches between transmitting or receiving RF signals in the single band. An RF band typically spans a range of frequencies (e.g., 10 to 100 MHz per band), and actual signal transmission and reception may be in subbands of such bands, which may overlap. Alternatively, two widely spaced RF bands may be used for signal transmission and reception, respectively.

More advanced radio systems, such as some cellular telephone systems, may be operable over multiple RF bands for signal transmission and reception, but at any one time still use only one transmit sub-band and one receive sub-band within a single RF band, or only two widely spaced transmit and receive RF bands. Such multi-band operation allows a single radio system to be interoperable with different international frequency allocations and signal coding systems (e.g., CDMA, GSM). For some applications, international standards bodies have labeled common frequency bands with labels. One such standards body is the 3rd Generation Partnership Project (3GPP). For instance, bands covered by the 4G LTE (for "4th Generation, Long Term Evolution") standard are commonly labeled a "Bn" (e.g., B1, B3, B7); one listing of such bands may be found in the 3GPP reference TS 36.101. As another example, bands covered by the 5G NR (for "5th Generation, New Radio") technology standard for broadband cellular networks are commonly labeled from n1 to n98; see, for instance, the listing in 3GPP references TS 38.101-1 and TS 38.101-2.

A technique called "Carrier Aggregation" (CA) has been developed to increase bandwidth for RF radio systems, and in particular cellular telephone systems. In one version of CA known as "inter-band" mode, cellular reception or transmission may occur over multiple RF bands simultaneously (e.g., RF bands B1, B3, and B7). This mode requires passing the receive or transmit RF signal through multiple band filters simultaneously, depending on the required band combination.

A design challenge in many radio systems—particularly advanced radio systems—is dealing with RF interference. For instance, simultaneous asynchronous transmission and reception over different nearby bands generally causes RF noise/leakage from transmission over one band to interfere with reception over another band. As one example, cellphone transmission at the low end of the n41 band (2496-2690 MHz) may generate noise/leakage in the n40 band (2300-2400 MHz) between cellphones as well as within the transmitting cellphone. In addition, cellphone transmission over the n41 band may generate noise/leakage in the 2.4 GHz WiFi band (2402-2480 MHz).

RF interference may also arise in systems using inter-band carrier aggregation with non-contiguous resource block allocations (e.g., bands n77 and n79). Transmission leakage may impact reception within the same communication device despite antenna and diplexer isolation. As another example, communication devices (e.g., cellphones) that operate simultaneously over different generations of band allocations (e.g., LTE and 5G NR bands such as B42 and n79) may similarly experience interference on the reception path of one or both bands from self-transmissions.

Conventionally, notch and bandpass filters have been used to isolate or pass RF signals within a transceiver. However, the effectiveness of such filters is dependent on a great number of factors, including basic design and frequency response characteristics such as bandwidth and insertion loss, fabrication, component aging, radio device damage, and finite linearity and power handling. These factors, and in light of increasingly close and crowded RF bands (between bands and non-contiguous intra-band spectrum allocations), have made it important to actually measure interference within an RF band from unwanted signals or potential interference to wanted received signals from transmitted signals. This is especially true for applications and deployments where non-interference may be critical, such as in public safety and/or security RF bands.

One approach to measuring interference within an RF band is to measure the total average power, $P_{AVG}$, across the entire bandwidth of the band. However, this approach assumes that power is uniformly distributed across all frequencies of the band, and accordingly may miss interference caused by the presence of an unwanted signal (power) in only a portion of the band. Without actual fine-resolution measurements of RF signal power in a band, there is no assurance that interference is not occurring with conventional approaches.

Accordingly, there is a need for circuits and methods that more accurately measure RF interference or the potential of RF interference. The present invention addresses this need.

SUMMARY

The present invention encompasses circuits and methods that provide fine-resolution measurements of RF signal power within a communication system band, thereby more accurately measuring RF interference or the potential of RF interference.

One aspect of embodiments of the present invention is a narrow-band tunable filter that includes two elements coupled in series, a periodic passband filter and a tunable filter. The purpose of the periodic passband filter is to generate multiple periodic passbands for an applied RF signal. The purpose of the tunable filter is to selectively generate a single passband, generally with a tunable center frequency. By serially coupling the two filter types in cascade (in either order), the single passband of the tunable filter is superimposed over one of the periodic passbands of the periodic passband filter, synergistically resulting in an extremely narrow passband.

One embodiment of the present invention includes power spectral density power detector including: a narrow-band tunable filter (NTF) configured to receive a radio frequency signal having a first bandwidth and impose on the received radio frequency signal a narrow passband having a second bandwidth less than the first bandwidth, the narrow-band tunable filter including a periodic passband filter and a tunable filter coupled in series with the periodic passband filter; and a power detection circuit coupled to the narrow-band tunable filter and configured to receive a range of radio frequencies in the narrow passband and output a signal representing the power spectral density of the range of radio frequencies in the narrow passband.

Another embodiment of the present invention includes a method for determining a fine-resolution Power Spectral Density (PSD) of a radio frequency signal having a first bandwidth, the method including: filtering the radio frequency signal in any order through a periodic passband filter configured to impose multiple periodic passbands on the radio frequency signal and through a tunable filter configured to impose a single passband on the radio frequency signal, the single passband having a selectable center frequency, wherein the filtering results in imposition on the radio frequency signal of a narrow passband having a second bandwidth less than the first bandwidth; measuring the power spectral density of the radio frequencies in the narrow passband; and outputting a signal representing the power spectral density of the radio frequencies in the narrow passband.

The details of one or more embodiments of the invention are set forth in the accompanying drawings and the description below. Other features, objects, and advantages of the invention will be apparent from the description and drawings, and from the claims.

DESCRIPTION OF THE DRAWINGS

FIG. 4A shows a first embodiment of an NTF comprising a periodic passband filter coupled in series with a tunable filter.

FIG. 4B shows a second embodiment of an NTF comprising a tunable filter coupled in series with a periodic passband filter.

Like reference numbers and designations in the various drawings indicate like elements.

DETAILED DESCRIPTION

The present invention encompasses circuits and methods that provide fine-resolution measurements of RF signal power within a communication system band, thereby more accurately measuring RF interference or the potential of RF interference.

One measurement of RF interference is the Power Spectral Density (PSD) of an RF signal, which describes the power present in the RF signal as a function of frequency, per unit frequency. A number of communication standards specify limits on a related measure, total Average Power ($P_{AVG}$), which is the aggregated Power across an entire RF communication channel bandwidth.

Interference Measurement Resolution

Figure 1:
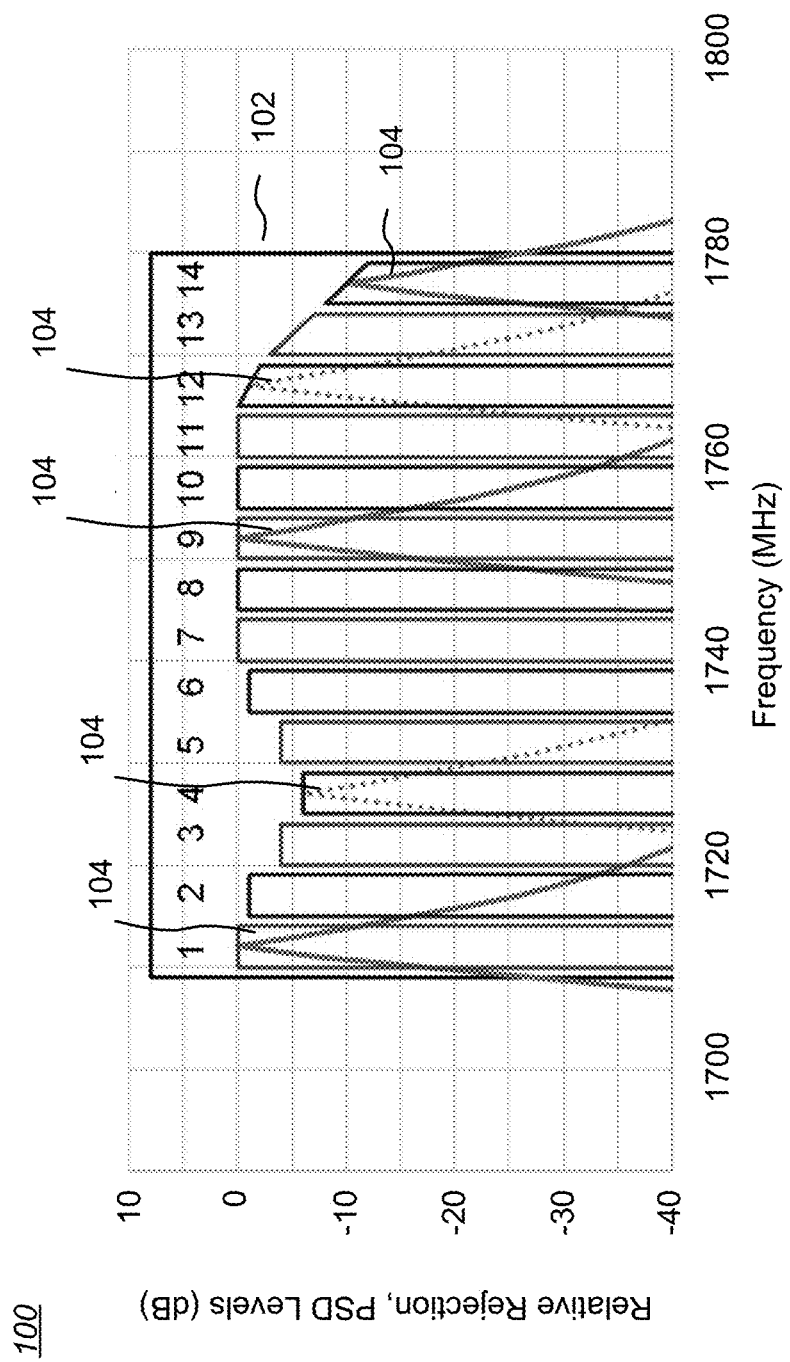
FIG. 1 is a graph of representative PSD levels versus frequency within an example RF channel.

FIG. 1 is a graph 100 of representative PSD levels versus frequency within an example RF channel. The channel (e.g., the n66 band) ranges from 1710 MHz to 1780 MHz and includes a set of resource blocks (RBs) allocated within contiguous 5 MHz chunks (or steps) of frequency denoted as 1-14, each representing distinct 5 MHz transmission bandwidths. Each 5 MHz transmission bandwidth contains one or more resource blocks and may contain up to a maximum number of resource blocks that is generally dependent on sub-carrier frequency spacing that may be specified by a communication standard such as 3GPP (see discussion below for further detail regarding RBs). The illustrated example shows PSD measurements (the rectangular and trapezoidal blocks) made in transmission bandwidths using the present invention. In this particular example, the rectangular blocks represent measurements that are steady in frequency across 5 MHz steps. The trapezoidal blocks (e.g., in steps 12-14) represent typical real-life values.

The average total power level $P_{AVG}$ is an integration or summation of the individual one MHz power spectrum densities over a frequency range and is therefore a single value over the frequency range for a particular time period. Being an average value, a large perturbation across any of the 5 MHz steps can easily be missed in an average power measurement. For example, in one modeled circuit, $P_{AVG}$ as measured over the n66 band differed from a target value by only 1.51 dB. However, as shown in the example of FIG. 1, the PSD varies by more than 5 dB across multiple 5 MHz frequency steps. As should be apparent from FIG. 1, a large amount of excessive signal power in one or a few 5 MHz steps may cause substantial interference in external devices yet still yield an acceptable value for $P_{AVG}$. This indicates the value of the greater accuracy of the PSD method, if performed at high resolution, compared to conventional usage of $P_{AVG}$ in determining interference. Note that the 5 "peaky" curves 104 in steps 1, 4, 9, 12, and 14 superimposed on the plot of PSD measurements represent the output signal values at the outputs of an example set of NTFs (not all outputs corresponding to all NTFs are shown—only 5 of them are shown in FIG. 1 by way of example).

The challenge is to actually measure the PSD at a fine resolution (e.g., power per MHz) within a channel or band. Accordingly, embodiments of the present invention target extremely fine selectivity for a PSD power detector that enables monitoring of transmission signal (e.g., for detecting excessive signal power which may cause interference in other devices) from an RF device (e.g., a mobile unit such as a cellular telephone) and/or monitoring of spurious received signals (e.g., detecting power of interfering signals received in an RF device emanating from other sources) and/or monitoring reflected signals where reflections are unwanted and may be due to degradations in the RF device and/or in the communication environment (e.g., detecting reflected signal power and accordingly adjusting the frequency allocations of transmission signals at a fine granularity). Such embodiments allow verification of transmission signal power, transmission quality, and spurious received levels autonomously—that is, without substantially affecting other RF transmission or reception circuitry—and is not reliant on numerical approximations or performance assumptions of an RF system.

Fine-Resolution Forward-Coupled PSD Power Detector

A. Overview

Figure 2:
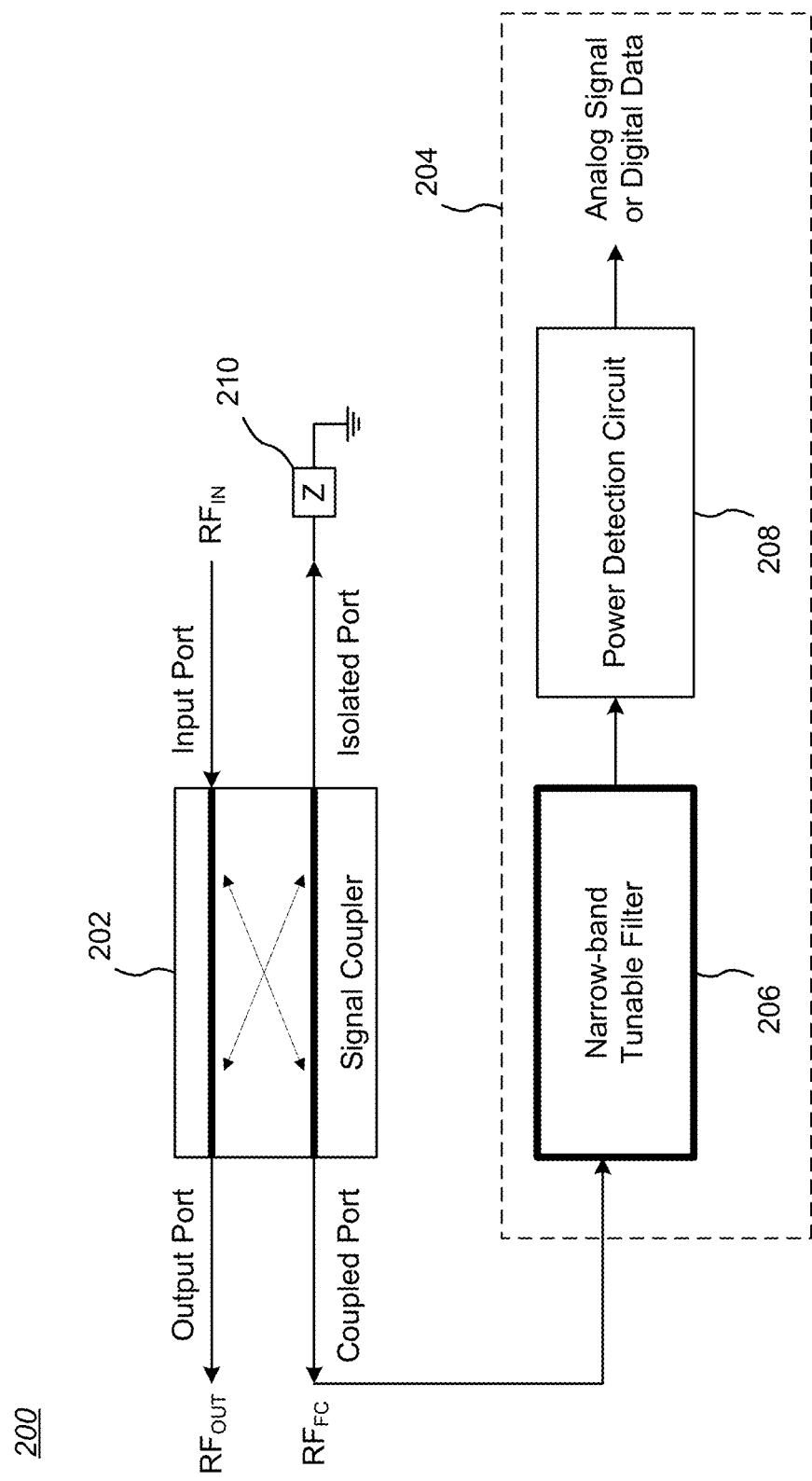
FIG. 2 is a block diagram of a first embodiment of a PSD analysis circuit in accordance with the present invention.

FIG. 2 is a block diagram of a first embodiment of a PSD analysis circuit 200 in accordance with the present invention. The PSD analysis circuit 200 includes a signal coupler 202 configured to receive an $RF_{IN}$ signal and output both an $RF_{OUT}$ signal and a forward-coupled signal $RF_{FC}$. The $RF_{IN}$ signal may be, for example, an RF signal being transmitted by a local device that includes the PSD analysis circuit 200, or an RF signal received by such a device, such as through an antenna.

The forward-coupled signal $RF_{FC}$ is applied to an input of a fine-resolution PSD power detector 204. The coupled PSD power detector 204 includes a narrow-band tunable filter ( ) 206 of unique design, as detailed below, configured to receive the forward-coupled signal $RF_{FC}$. The NTF 206 provides extremely narrow passband frequency selectivity that enables PSD measurements at a fine resolution level, such as less than about 20% of the entire channel bandwidth being analyzed, and only about 1% of the entire channel bandwidth being analyzed in many applications. This commonly results in a resolution of 1 MHz in the sub-6 GHz frequency range. The filtered RF output of the NTF 206 is applied to a power detection circuit 208, which may output an analog signal or digital data representing the power content (i.e., PSD) of the signal over the applied narrow passband frequency.

B. Signal Coupler

Figure 3:
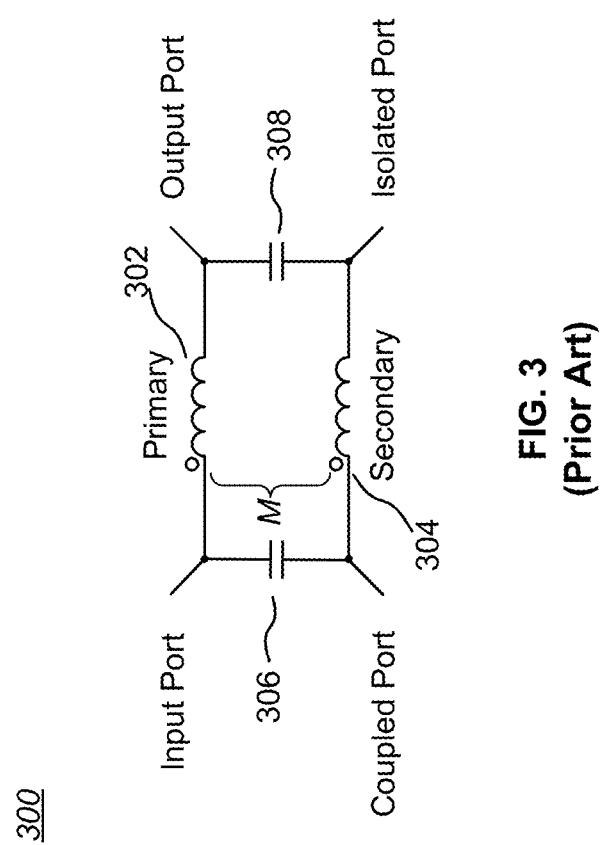
FIG. 3 is a simple equivalent circuit for a conventional bi-directional quarter-wave directional coupler that may be adapted for use as the signal coupler of FIG. 2.

The signal coupler 202 may be of any convenient design, and is preferably broadband. For example, FIG. 3 is a simple equivalent circuit for a conventional bi-directional quarter-wavelength coupler 300 that may be adapted for use as the signal coupler 202 of FIG. 2. As is known in the art, a directional coupler may be implemented with two quarter-wavelength transmission lines in close enough proximity so that energy from one transmission line passes to the other transmission line via inductive and capacitive coupling. The inductive coupling of the quarter-wavelengths of the primary and secondary transmission lines of a quarter-wave directional coupler may be respectively modeled as inductors 302, 304, while the capacitive coupling between the transmission lines may be modeled as capacitors 306, 308. There is also a mutual inductive coupling M between both inductors 302, 304. In more complete models, parasitic capacitances (e.g., between the transmission lines and a ground plane) may be coupled to each port. Directional couplers based on transmission lines may be realized in a number of technologies including coaxial, stripline, and microstrip technologies.

The quarter-wavelength directional coupler 300 has four ports: (1) an Input Port where power is applied (e.g., a locally-transmitted RF signal to an antenna or a locally-received RF signal from an antenna); (2) a Coupled Port where an electromagnetically coupled portion of the power applied to the Input Port appears; (3) an Output Port where the power from the Input Port is output, less the portion of the power sent to the Coupled Port; and (4) an Isolated Port where inductively coupled current and capacitively coupled power essentially cancel each other. If the quarter-wavelength directional coupler 300 is adapted for use with the signal coupler 202 of FIG. 2, then $RF_{IN}$ would be applied to Input Port, $RF_{OUT}$ would be available at the Output Port, and the forward-coupled signal $RF_{FC}$ would be available at the Coupled Port. The Isolated Port may be terminated with a matching load impedance 210.

The portion of the input power applied to the Input Port and coupled to the Coupled Port depends on the coupling factor of a particular implementation. For example, a 3 dB coupler splits the input power evenly between the Outport Port and Coupled Port, resulting in a 1:1 ratio. A 10 dB coupler splits the input power between the Outport Port and Coupled Port by about a 9:1 ratio (i.e., about 10% of the incident power is split off to the Coupled Port), and a 20 dB coupler splits the input power split between the Outport Port and Coupled Port by about a 99:1 ratio (i.e., about 1% of the incident power is split off to the Coupled Port). In order to reduce the impact of the PSD analysis circuit 200 on overall system performance, it is preferable to use at least a 10 dB coupler, and more preferable to use at least a 20 dB coupler, for the signal coupler 202.

While FIG. 3 shows a quarter-wavelength directional coupler 300 that may be adapted for use as the signal coupler 202 of FIG. 2, other signal couplers of known design may be used to accomplish the same function, including, for example, branch-line couplers, Lange couplers, hybrid couplers, and even some forms of power dividers.

C. Narrow-Band Tunable Filter (NTF)

The NTF 206 of FIG. 2 includes two elements coupled in series, a periodic passband filter and a tunable filter. FIG. 4A shows a first embodiment of an NTF 206 comprising a periodic passband filter 402 coupled in series with a tunable filter 404, while FIG. 4B shows a second embodiment of an NTF 206 comprising a tunable filter 404 coupled in series with a periodic passband filter 402. Accordingly, the order of the specialized periodic passband filter and a tunable filter is interchangeable.

The purpose of the periodic passband filter 402 is to generate multiple periodic passbands for an applied RF signal. The purpose of the tunable filter 404 is to generate a single passband, generally with a tunable center frequency. By serially coupling the two filter types in either order, the single passband of the tunable filter 404 is superimposed over one of the periodic passbands of the periodic passband filter 402, synergistically resulting in an extremely narrow passband (e.g., less than about 20% of the entire channel bandwidth being analyzed, and only about 1% of the entire channel bandwidth being analyzed in many applications).

D. Tunable Filter Element

The tunable filter 404 may be of conventional design, but preferably should provide a rejection of 30 dB (i.e., an insertion loss of −30 dB) or more for frequencies immediately outside of a specified frequency range (e.g., ±5 MHz) centered at each of multiple selected center frequencies (e.g., 0.810 GHz, 0.849 GHz, and 0.887 GHz). The tunable filter 404 should also preferably provide a passband where the insertion loss is as small as possible (i.e., as close as possible to 0 dB) within a specified frequency range (e.g., ±5 MHz) centered at each center frequency. Frequencies outside of the specified passband are referred to as the stopband or as stopband frequencies. Such filters may be based on inductor-capacitor (LC) circuits, and/or on acoustic wave resonators, including surface acoustic wave (SAW) resonators, bulk acoustic wave (BAW) resonators, film bulk acoustic resonators (FBAR), transversely-excited film bulk acoustic resonators (XBAR), and laterally vibrating resonators (LVRs). In some embodiments, the specified functionality may be provided by a switched bank of fixed filters having similar passband characteristics but with different center frequencies, any one of which may be switched into circuit with the periodic passband filter 402. In some embodiments, the tunable filter 404 need not be dynamically tunable, but instead be "tuned" during manufacturing (e.g., during fabrication or calibration testing) to be a single filter having a fixed center frequency and the specified passband and stopband characteristic (e.g., a −30 dB or more rejection stopband and a passband of about 10 MHz or less). This may be useful, for example, where it is known that interference might occur only in a single narrow frequency range or to purposefully sample only a specific narrow frequency band.

Figure 5A:
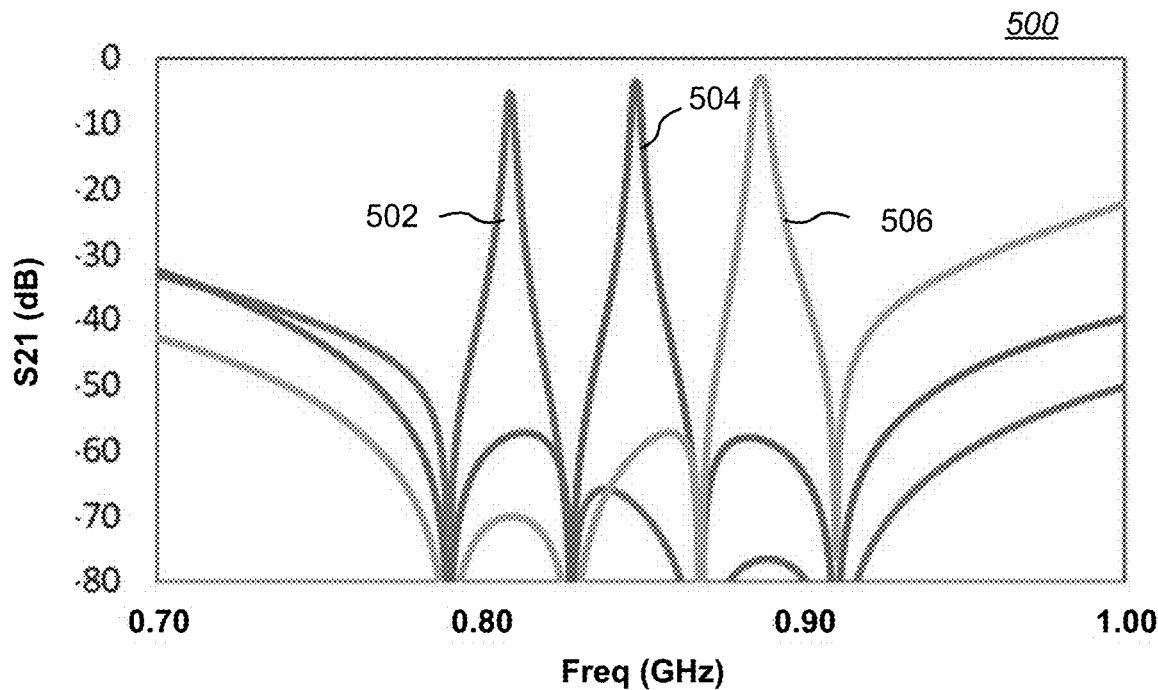
FIG. 5A is a graph showing S21 scattering parameter measurements (which are proportional to insertion loss) versus frequency for an example embodiment of a tunable filter.

FIG. 5A is a graph 500 showing S21 scattering parameter measurements (which are proportional to insertion loss) versus frequency for an example embodiment of a tunable filter 404. In the illustrated example, a first graph line 502 shows the frequency response for the tunable filter 404 when tuned to a center frequency of about 0.810 GHz. A second graph line 504 shows the frequency response for the tunable filter 404 when tuned to a center frequency of about 0.849 GHz. A third graph line 506 shows the frequency response for the tunable filter 404 when tuned to a center frequency of about 0.887 GHz. While three center frequency response curves are shown, it should be appreciated that a tunable filter 404 may have a continuous range or a discrete range of individual center frequencies spanning a wide bandwidth (e.g., hundreds of MHz).

Figure 5B:
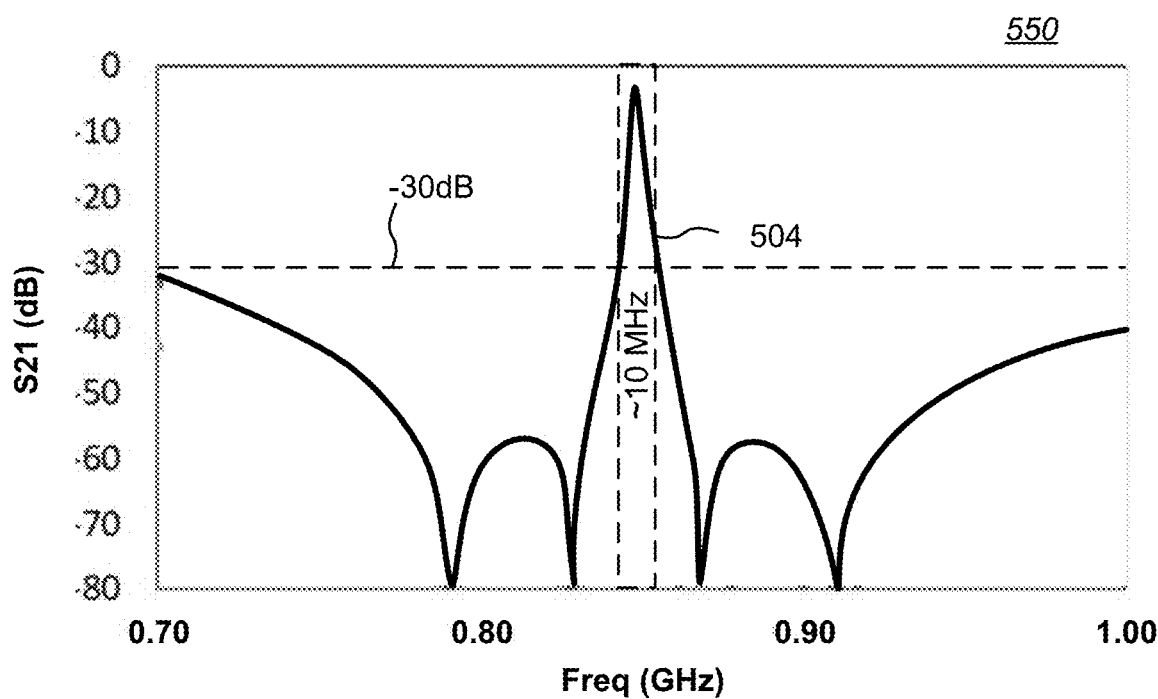
FIG. 5B is a graph showing S21 scattering parameter measurements versus frequency for an example embodiment of a tunable filter tuned to a center frequency of about 0.85 GHz.

FIG. 5B is a graph 550 showing S21 scattering parameter measurements versus frequency for an example embodiment of a tunable filter 404 tuned to a center frequency of about 0.85 GHz. FIG. 5B thus shows the second graph line 504 of FIG. 5A in isolation, highlighting the distinct passband around the center frequency (e.g., a passband of about 10 MHz or less).

E. Periodic Passband Filter Element

The periodic passband filter 402 is preferably a passive low-insertion loss (IL) RF filter that provides multiple passbands, and may be based on a Lateral Overtone Acoustic Bulk Resonator (LOBAR) or a High Overtone Bulk Acoustic Resonator (HBAR). A LOBAR-based filter in particular provides a high-Q periodic grating of multiple (e.g., from 2 to in excess of 15) passbands at periodic intervals (each passband a "tone"). The number of passbands, the period of the spacing between passbands, and the frequency range of the set of passbands are all design parameters that may be optimized for a particular application.

Figure 6A:
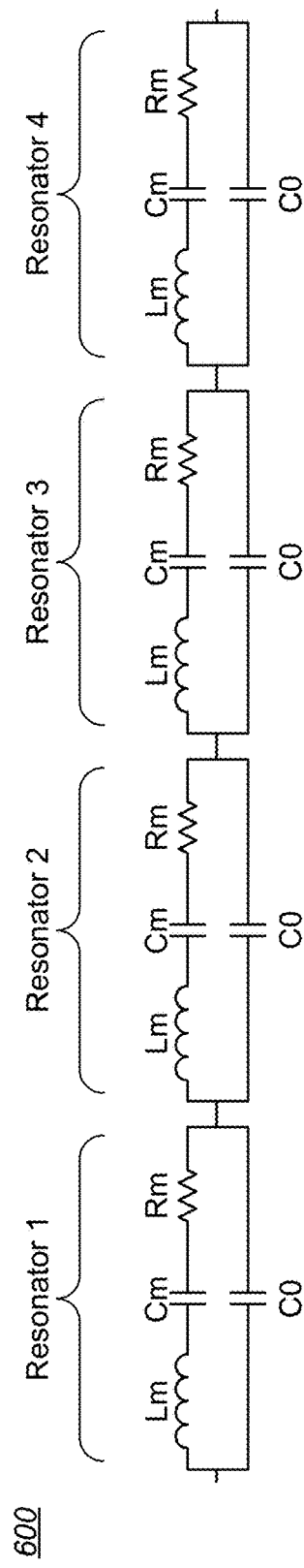
FIG. 6A is an example of an equivalent circuit for a modeled LOBAR-based periodic passband filter using four resonators connected in series to create three passbands.

FIG. 6A is an example of an equivalent circuit 600 for a modeled LOBAR-based periodic passband filter using four resonators (each modeled by the well-known Butterworth Van Dyke model) connected in series to create three passbands, i.e., three "spikes". Each resonator includes an inductor Lm, a capacitor Cm, and a resistor Rm coupled in series and representing the motional (acoustic) characteristics of an acoustic wave resonator near a resonance point, while a bracketing parallel capacitor C0 represents the electrostatic plate capacitance of the acoustic wave resonator (noting that an acoustic wave resonator physically comprises two electrode structures capacitively coupled by a piezoelectric material with dielectric properties).

Figure 6B:
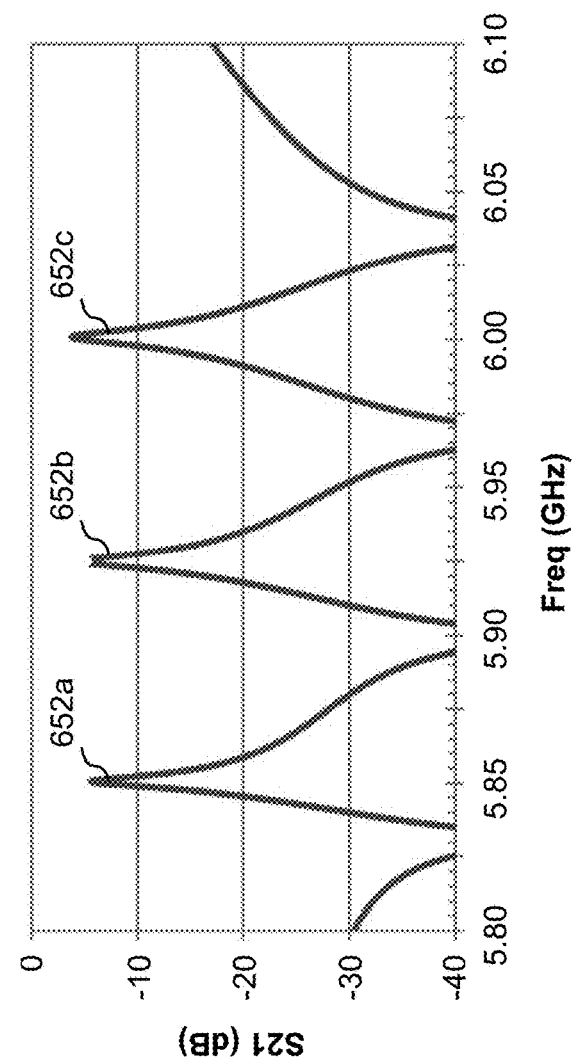
FIG. 6B is a graph showing S21 scattering parameter measurements versus frequency for an example modeled LOBAR-based periodic passband filter having the equivalent circuit shown in FIG. 6A.

FIG. 6B is a graph 650 showing S21 scattering parameter measurements versus frequency for an example modeled LOBAR-based periodic passband filter having the equivalent circuit 600 shown in FIG. 6A. The graph lines 652a, 652b, and 652c show the three passbands generated by the four concatenated resonators. For the illustrated example, the equivalent circuit values are set forth in TABLE 1.

TABLE 1

|    | Resonator 1 | Resonator 2 | Resonator 3 | Resonator 4 | units |
| --- | --- | --- | --- | --- | --- |
| Lm | 4.148 | 4.100 | 4.053 | 4.007 | nH |
| Cm | 180 | 178 | 175 | 174 | fF |

TABLE 1-continued

|  | Resonator 1 | Resonator 2 | Resonator 3 | Resonator 4 | units |
|---|---|---|---|---|---|
| Rm | 0.030 | 0.030 | 0.030 | 0.030 | Ohms |
| C0 | 2.316 | 2.289 | 2.263 | 2.237 | pF |

Additional information about the structure, fabrication, and characteristics of LOBAR-based periodic passband filters may be found, for example, in Lu et al., "*RF Filters with Periodic Passbands for Sparse Fourier Transform-Based Spectrum Sensing*", Journal of Microelectromechanical Systems, Vol. 27, No. 5, October 2018.

Figure 7A:
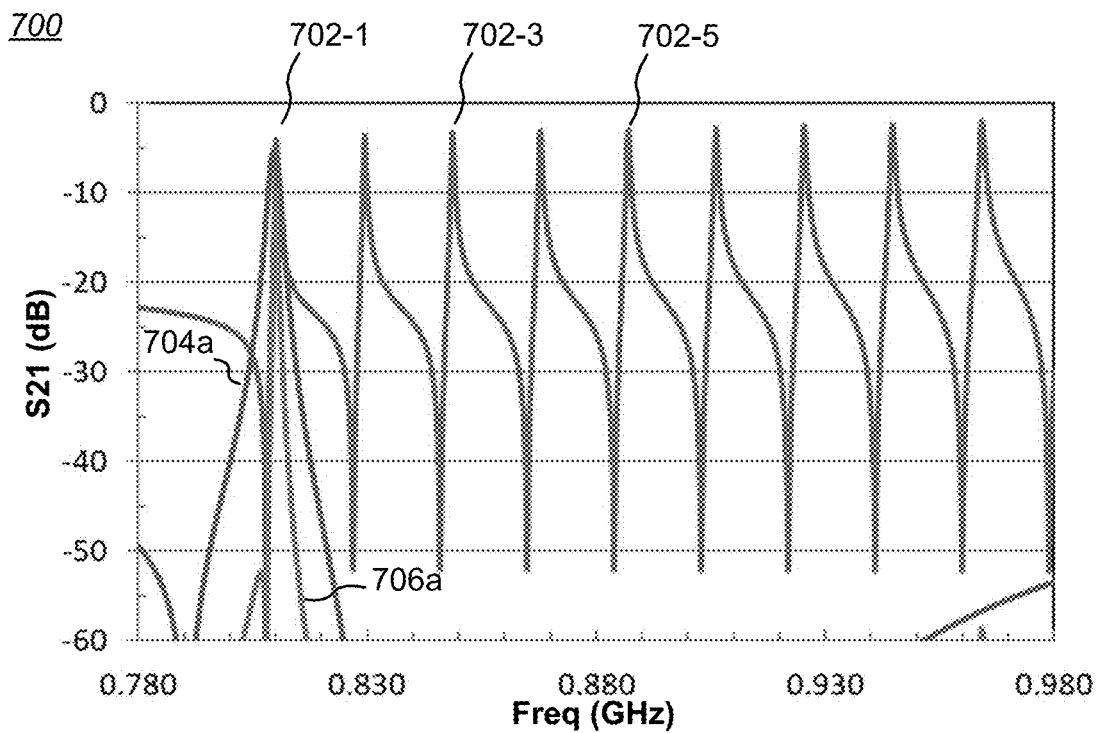
FIG. 7A is a graph showing S21 scattering parameter measurements versus frequency for a first tuning state of an example periodic passband filter, an example tunable filter, and an NTF comprising those two filters.

FIG. 7A is a graph 700 showing S21 scattering parameter measurements versus frequency for a first tuning state of an example periodic passband filter 402, an example tunable filter 404, and an NTF 206 comprising those two filters. Graph lines 702-1, 702-3, and 702-5 indicate three examples of the multiple passbands generated by the periodic passband filter 402. Graph line 704a shows a single passband from the tunable filter 404, tuned to a center frequency of about 0.810 GHz. Graph line 706a shows the superimposition of the passband 704a from the tunable filter 404 over the first passband 702-1 of the multiple passbands from the periodic passband filter 402.

Figure 7B:
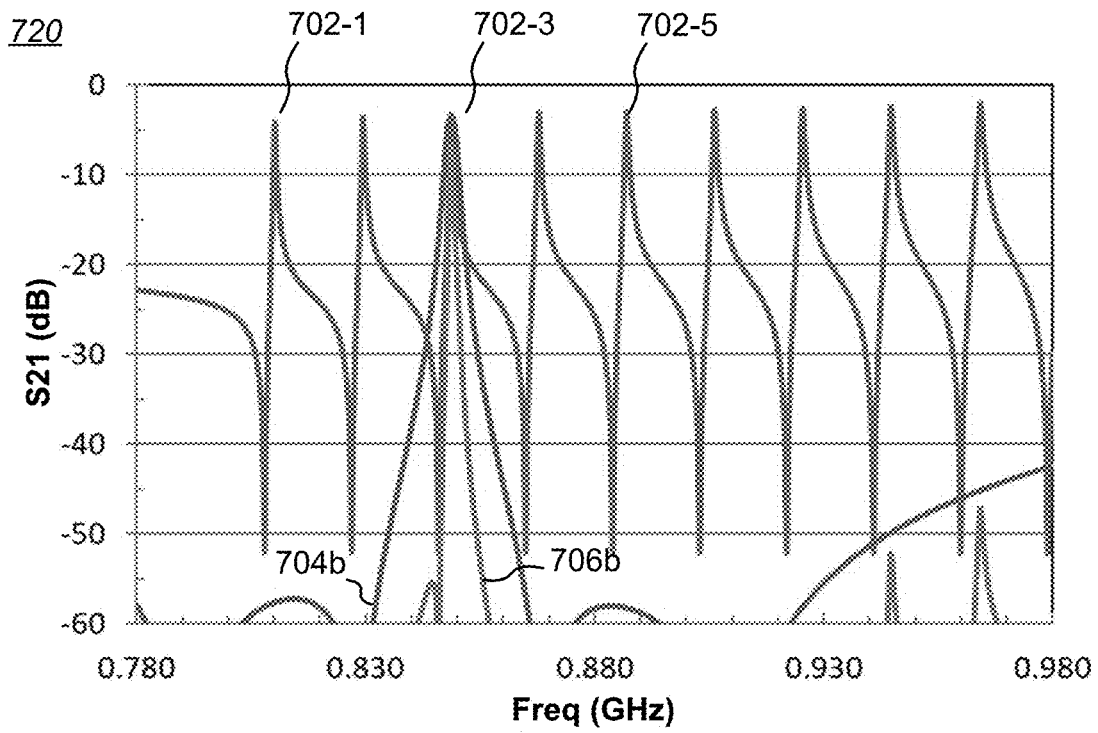
FIG. 7B is a graph showing S21 scattering parameter measurements versus frequency for a second tuning state of an example periodic passband filter, an example tunable filter, and an NTF comprising those two filters.

FIG. 7B is a graph 720 showing S21 scattering parameter measurements versus frequency for a second tuning state of an example periodic passband filter 402, an example tunable filter 404, and an NTF 206 comprising those two filters. Graph lines 702-1, 702-3, and 702-5 show three examples of the multiple passbands generated by the periodic passband filter 402. Graph line 704b shows a single passband from the tunable filter 404, tuned to a center frequency of about 0.849 GHz. Graph line 706b shows the superimposition of the passband 704b from the tunable filter 404 over the third passband 702-3 from the periodic passband filter 402.

Figure 7C:
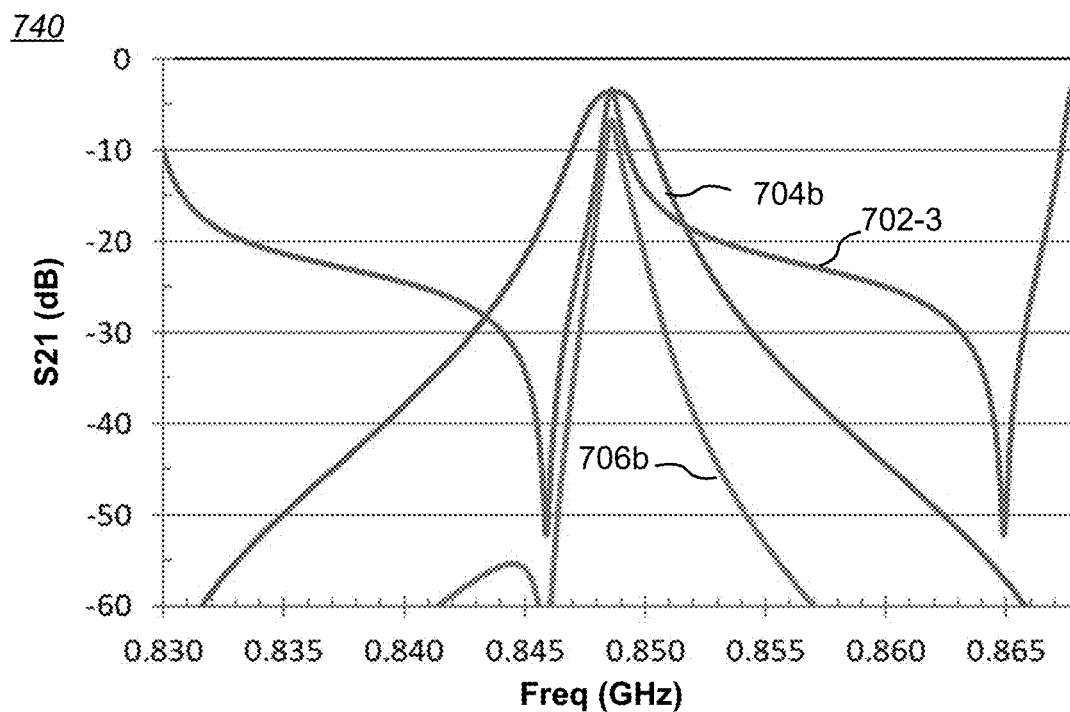
FIG. 7C is a magnified version of the graph of FIG. 7B, showing in greater detail the superimposition of the passband from the tunable filter over the second one of the multiple passbands from the periodic passband filter.

FIG. 7C is a magnified version 740 of the graph 720 of FIG. 7B, showing in greater detail the superimposition of the passband 704b from the tunable filter 404 over the third passband 702-3 from the periodic passband filter 402.

Figure 7D:
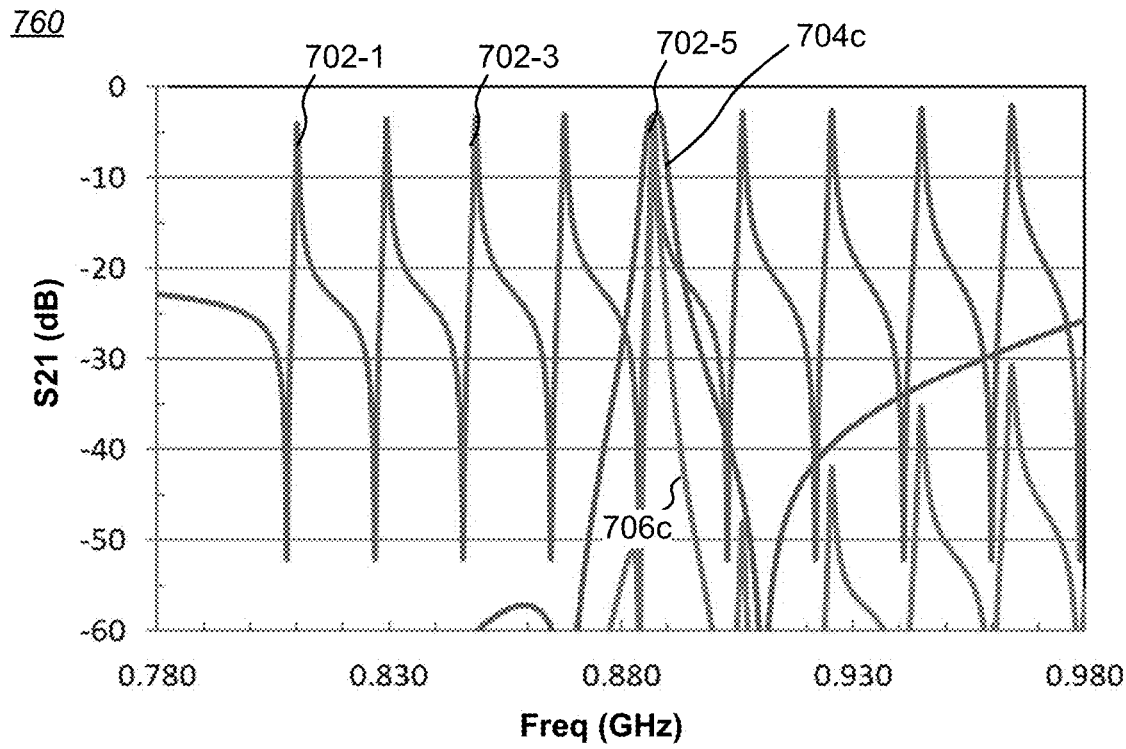
FIG. 7D is a graph 760 showing S21 scattering parameter measurements versus frequency for a third tuning state of an example periodic passband filter, an example tunable filter, and an NTF comprising those two filters.

FIG. 7D is a graph 760 showing S21 scattering parameter measurements versus frequency for a third tuning state of an example periodic passband filter 402, an example tunable filter 404, and an NTF 206 comprising those two filters. Graph lines 702-1, 702-3, and 702-5 show three examples of the multiple passbands generated by the periodic passband filter 402. Graph line 704c shows a single passband from the tunable filter 404, tuned to a center frequency of about 0.887 GHz. Graph line 706c shows the superimposition of the passband 704c from the tunable filter 404 over the fifth passband 702-5 from the periodic passband filter 402.

TABLE 2 below shows measured values corresponding to the modeled circuit responses graphically shown in FIGS. 7A-7D. The "tuned frequency" is the center frequency of the resultant passband responses 706x shown in those figures, resulting from the superimposition of a selected passband response 704x of the tunable filter 404 with respect to one passband response 702x of the periodic passband filter 402. More precisely, the frequency response of the NTF is the multiplication of each individual frequency response of the tunable filter 404 with respect to the periodic passband filter 402. The low-side and high-side attenuation values are the S21 loss for the resultant passbands 706x measured at 5 MHz below and above the tuned center frequency, respectively. The insertion loss (IL) is the least negative insertion loss of the resultant passbands 706x (i.e., the insertion loss measured at the center frequency of each resultant passband 706x). The "minimum rejection" for a state is the insertion loss minus the least negative amount of low-side or high-side 5 MHz attenuation. Thus, for State (a) in TABLE 2, the IL of −9.8 dB minus the least negative ±5 MHz attenuation level of −53.6 dB yields a minimum rejection value of 43.8 dB. Accordingly, for the example shown in FIGS. 7A-7D, the minimum rejection was greater than 30 dB for all three states.

TABLE 2

|  | Tuned Freq (MHz) | −5 MHz Low-side Atten. (dB) | IL (dB) | +5 MHz High-side Atten. (dB) | Minimum Rejection (dB) |
|---|---|---|---|---|---|
| State (a) | 810 | −54.9 | −9.8 | −53.6 | 43.8 |
| State (b) | 849 | −56.1 | −6.8 | −47.6 | 40.8 |
| State (c) | 887 | −51.5 | −6.0 | −36.8 | 30.8 |

As FIGS. 7A-7C make clear, the superimposition of a single passband 704x from the tunable filter 404 over one of the multiple passbands 702x from the periodic passband filter 402 synergistically results in an even sharper passband 706x that is especially well-suited for a PSD analysis circuit 200 (e.g., less than about 20% of the entire channel bandwidth being analyzed, and only about 1% of the entire channel bandwidth being analyzed in many applications).

As another example, in a much higher frequency range, TABLE 3A below shows measured loss and rejection values corresponding to ±5 MHz attenuation levels for a different modeled circuit. The minimum rejection was greater than 10 dB for all three states.

TABLE 3A

|  | Tuned Freq (MHz) | −5 MHz Low-side Atten. (dB) | IL (dB) | +5 MHz High-side Atten. (dB) | Minimum Rejection (dB) |
|---|---|---|---|---|---|
| State (a) | 5850 | −27.0 | −11.4 | −23.3 | 11.9 |
| State (b) | 5925 | −22.2 | −9.0 | −19.7 | 10.7 |
| State (c) | 6000 | −17.3 | −7.1 | −17.4 | 10.3 |

Better minimum rejection values may be obtained for applications that may beneficially use relaxed (wider) attenuation level measurements. For example, TABLE 3B below shows measured loss and rejection values corresponding to ±10 MHz attenuation levels for a different modeled circuit. The minimum rejection was greater than 17 dB for all three states.

TABLE 3B

|  | Tuned Freq (MHz) | −5 MHz Low-side Atten. (dB) | IL (dB) | +5 MHz High-side Atten. (dB) | Minimum Rejection (dB) |
|---|---|---|---|---|---|
| State (a) | 5850 | −38.8 | −11.4 | −30.9 | 19.5 |
| State (b) | 5925 | −33.4 | −9.0 | −28.1 | 19.2 |
| State (c) | 6000 | −24.4 | −7.1 | −24.9 | 17.8 |

F. Power Detection Circuit

The power detection circuit 208 shown in FIG. 2 may be implemented using a number of known circuits, including a logarithmic detector. Logarithmic detectors produce a low frequency (DC) output that is logarithmically ("linear in dB") related to the input signal level. Logarithmic detectors are particularly suited to perform high dynamic range power measurements.

Various applications may also use other types of power detection circuit 208. For example, one such circuit that may be adapted is shown in U.S. Pat. No. 8,022,734, issued September 20, 2011, entitled "Low Current Power Detection Circuit Providing Window Comparator Functionality", assigned to the assignee of the present invention and hereby incorporated by reference.

The power detection circuit 208 may also include an analog-to-digital converter (ADC) to convert the output of a logarithmic or other analog power detector to a digital data format. In some embodiments, the power detection circuit 208 may include a lookup table that maps digital data from the actual power detection circuitry (e.g., a logarithmic detector) to calibrated outputs, for example, to provide a more linear response to control circuitry as the passbands of the NTF 206 are tuned.

Fine-Resolution Reverse-Coupled PSD Power Detector

Figure 8:
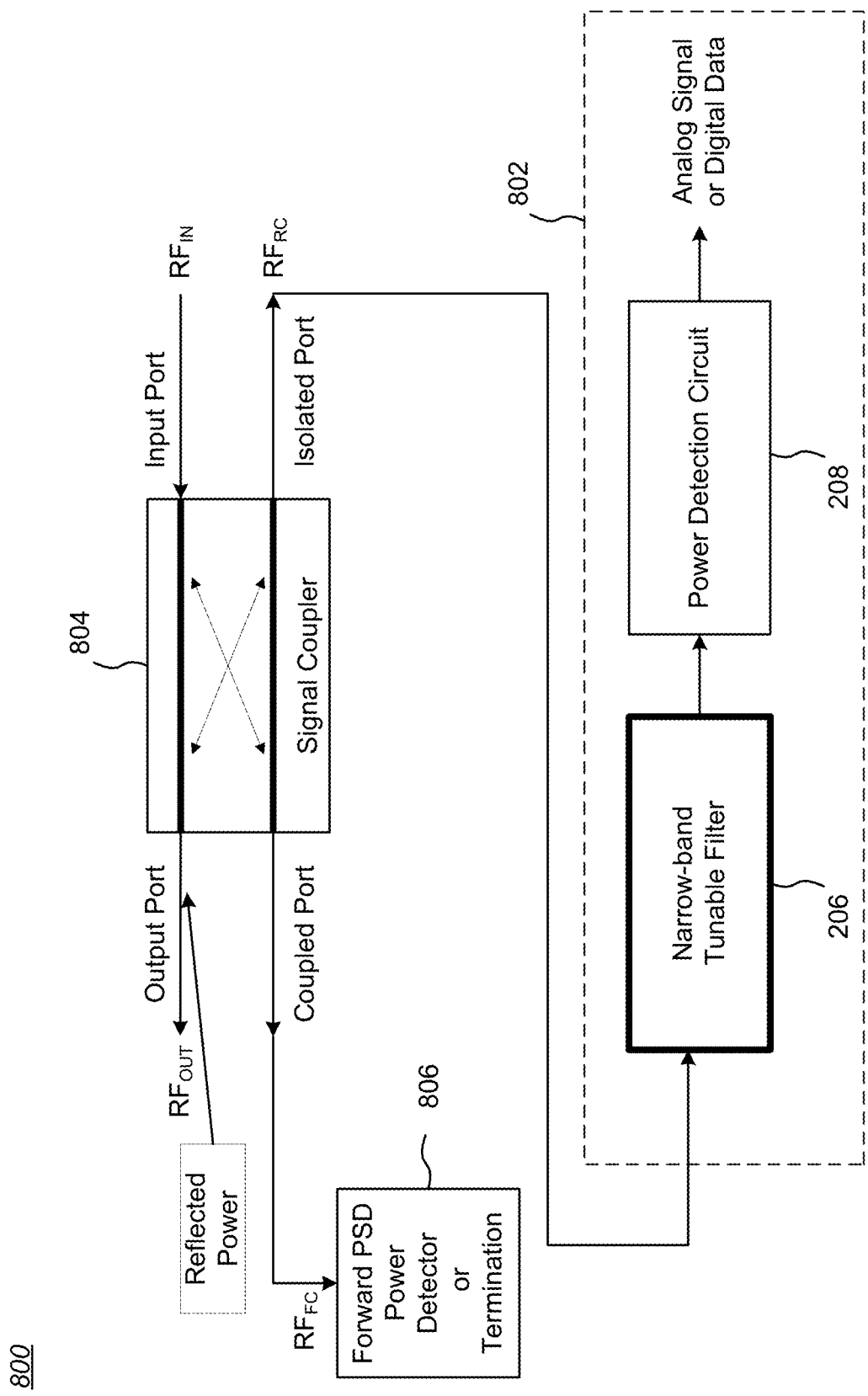
FIG. 8 is a block diagram of a second embodiment of a PSD analysis circuit that includes a fine-resolution reverse-coupled PSD power detector in accordance with the present invention.

As described above, the block diagram of FIG. 2 includes a fine-resolution forward-coupled PSD power detector 204 in accordance with the present invention. FIG. 8 is a block diagram of a second embodiment of a PSD analysis circuit 800 that includes a fine-resolution reverse-coupled PSD power detector 802 in accordance with the present invention.

The PSD analysis circuit 800 includes a signal coupler 804 configured to receive an $RF_{IN}$ signal on the Input Port and output an $RF_{OUT}$ signal on the nominal Output Port. A forward-coupled signal $RF_{FC}$ is available on the nominal Coupled Port and may be applied to other circuitry 806, such as a forward PSD power detector (as in FIG. 2) or termination circuitry.

The $RF_{IN}$ signal may be, for example, an RF signal being transmitted through an antenna by a local device that includes the PSD analysis circuit 800.

Reflected Power entering the $RF_{OUT}$ port (the nominal Output Port) will be available through the nominal Isolated Port as a reflected (or reverse) coupled signal $RF_{RC}$. Reflected power is a portion of the power of the output signal $RF_{OUT}$ that is reflected back (e.g., due to poor antenna performance) instead of being transmitted out of the local device as intended. The reflected coupled signal $RF_{RC}$ may be applied as an input to the PSD power detector 802, which is configured like the PSD power detector 204 of FIG. 2 and thus includes a narrow-band tunable filter (NTF) 206 coupled in series with a power detection circuit 208.

Poor antenna performance may be confined to a certain frequency range (sometimes referred to as "suck-out" frequencies). If such frequencies can be detected at sufficient resolution—such as by finely measuring reflected PSD within the transmission band at sufficiently fine frequency resolution using embodiments of the present invention—allocating resource blocks across such frequencies can be avoided. Also note that in this embodiment, PSD is being monitored and detected within the band that the local device is transmitting (rather than monitoring a band that the local transmitter, or any transmitter, is not supposed to interfere with, such as the CBTC band discussed below).

Various applications may use different combinations of PSD power detector in accordance with the present invention. For example, a device may include: only a forward-coupled PSD power detector 204 as shown in FIG. 2; only a reverse-coupled PSD power detector 802 as shown in FIG. 8; both a forward-coupled PSD power detector 204 and a reverse-coupled PSD power detector 802 coupled to different ports of a common signal coupler 804 as suggested in FIG. 8; or a forward-coupled PSD power detector 204 and a reverse-coupled PSD power detector 802 coupled to respective signal couplers 202, 804 (i.e., not sharing a single signal coupler).

Various applications may use more than one PSD power detector 204, 802 in the same coupled (forward or reverse) direction. For example, to accommodate an even wider band of frequencies, two or more PSD power detectors 204, 802 tunable to different ranges of frequencies may be connected to the same port of a single signal coupler 202, 804, for example, through a mux/demux operation, or through a set of discrete switches. Alternatively, two or more complete PSD analysis circuits 200, 800 tunable to different ranges of frequencies may be connected to an $RF_{IN}$ signal line directly in a cascade fashion.

In some applications, a PSD power detector 204, 802 may be selectively coupled through switches or a multiplexer to the Coupled Port and the Isolated Port of a single signal coupler 202, 804 so as to selectively make PSD measurements in a forward direction when switched into connection with the Coupled Port (as in FIG. 2) or in a reverse direction when switched into connection with the nominal Isolated Port (as in FIG. 8).

EXAMPLE APPLICATIONS

The output of a PSD power detector 204, 802 may be beneficially used for a variety of purposes, particularly in cellular radio systems. For example, under the 5G NR technology standard defined by the 3GPP, the bandwidth of cellular radio channels (e.g., 5 MHz, 10 MHz, . . . , 100 MHz, . . . ) is broken up into resource blocks (RBs). Each RB contains 12 sub-carriers spaced evenly by the sub-carrier spacing (SCS) frequency (there are, e.g., 15, 30, and 60 kHz SCS options for sub-6 GHz frequencies). For each channel bandwidth, there are a number N of evenly spaced active RBs which define a transmission bandwidth including active RBs where N is less than or equal to $N_{RB}$ and where $N_{RB}$ denotes the maximum number of allowed active RBs in a channel bandwidth. The $N_{RB}$ that may be specified, e.g., by 3GPP standards, may take into account guard bands on the edges of the transmission bandwidth.

As previously described, FIG. 1 shows application of a fine-resolution forward-coupled PSD analysis circuit 200 to confirm whether a local device (e.g., a cellular telephone handset) is a source of interference affecting another band (e.g., a public safety and/or security RF band) by measuring signal power transmitted from the local device at a fine granularity of frequencies, such as at an RB level. If a PSD level output from the PSD analysis circuit 200 exceeds a specified threshold, control circuitry for the local device may, for example, reduce transmission power in the frequency step and RB indicated by the PSD levels. Alternatively, the local device may decide not to allocate RBs in the specific frequency steps that fail the PSD threshold.

As another example, it may be noted that, in general, not all RBs in a channel or in a transmission bandwidth are in use at the same time. Further, which RBs may be used is selectable, such as by the radio control logic of a cellular telephone handset. Knowing the PSD measurements in a channel thus can enable a more optimal allocation of RBs, leading to better communication clarity, less interference, and more efficient power transmission, and thereby lower power usage.

Figure 9:
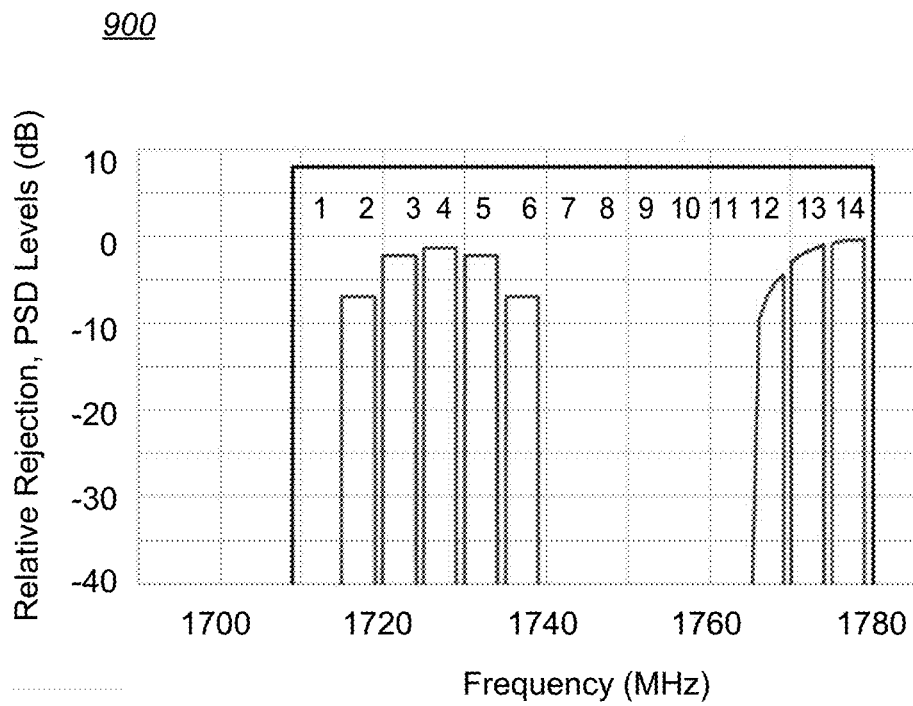
FIG. 9 is a graph of representative reflected PSD levels versus frequency within an example RF channel.

For example, FIG. 9 is a graph 900 of representative reflected PSD levels versus frequency within an example RF transmission channel. The example cellular radio channel spans a frequency range from 1710 MHz to 1780 MHz and includes a set of RBs used within 5 MHz steps. A fine-resolution reverse-coupled PSD analysis circuit 800 within a local device may be used to measure how much of the transmitted power is reflected across the multiple RB locations. In the example shown in FIG. 9, frequency steps 2-6 and 12-14 show significant reflected power. Accordingly, the control circuitry of the local device can reduce usage of RBs exhibiting significant reflected power and increase usage of RBs within frequency steps 1 and 7-11 that exhibit lower reflected power.

Figure 10:
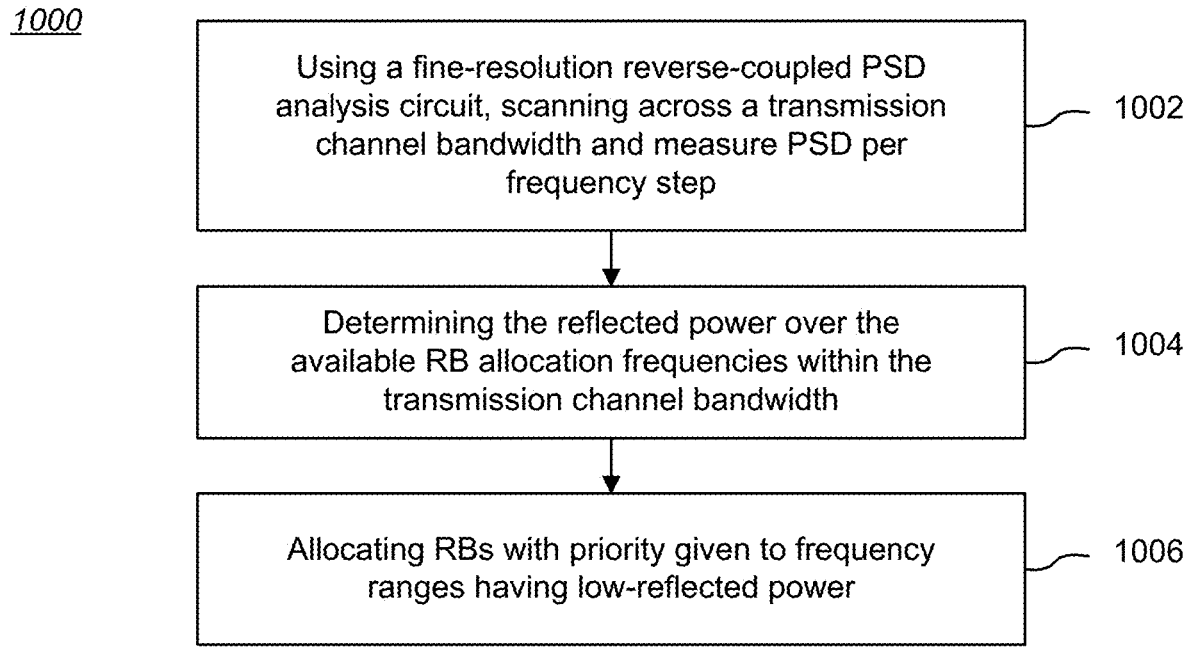
FIG. 10 is a process flow chart showing one method for more optimally allocating resource blocks in a communications system.

FIG. 10 is a process flow chart 1000 showing one method for more optimally allocating resource blocks in a communications system. The method includes: using a fine-resolution reverse-coupled PSD analysis circuit 800, scanning across a transmission channel bandwidth and measure PSD per frequency step [Block 1002]; determining the reflected power over the available RB allocation frequencies within the transmission channel bandwidth [Block 1004]; and allocating RBs with priority given to frequency ranges having low-reflected power [Block 1006].

The method shown in FIG. 10 is beneficial in applications requiring high reliability, such as communication systems for emergency first responders and safety systems (e.g., Communication Based Train Control systems (CBTC)). The method shown in FIG. 10 is particularly beneficial in applications requiring both high reliability and low-latency (such as ultra-reliable low latency communication—uRLLC—systems defined by 3GPP), such as factory automation, autonomous driving, the industrial internet, smart power grid, robotic surgeries, and Vehicle-to-Anything (V2X) applications. Use of a fine-resolution reverse-coupled PSD analysis circuit 800 allows data to be pushed through the best (e.g., lowest reflected power and thus with better power efficiency) RBs at a maximum modulation scheme and maximum coding ratio, i.e., maximum data throughput.

A fine-resolution reverse-coupled PSD analysis circuit 800 may also be useful to optimize both uplink and downlink Carrier Aggregation bands used in a number of RF systems. Measurements of PSD levels per channel and band may be used to enable independent usage by different devices of the same or adjacent bands, for example, by optimizing RB usage by each device.

Actions that may be taken when excessive PSD levels are measured by a local device (e.g., a local device as part of a protected system such as a CBTC system or a mobile communication device) include power rejection of interfering signals or modification of RB allocations to leverage RB locations having lower or no interference levels in a protected band, or modification of RB allocations to leverage RB locations in a transmission band having lower or no reflected power levels. In some applications, the allocated bandwidth may be increased while preserving the same $P_{AVG}$ value to reduce the PSD level and reduce interference.

Narrowband measurements of PSD levels in accordance with the present invention may also be used to improve antenna tuning across a channel bandwidth compared to conventional wideband power measurements, for example, by detecting suck-out frequencies.

Figure 11:
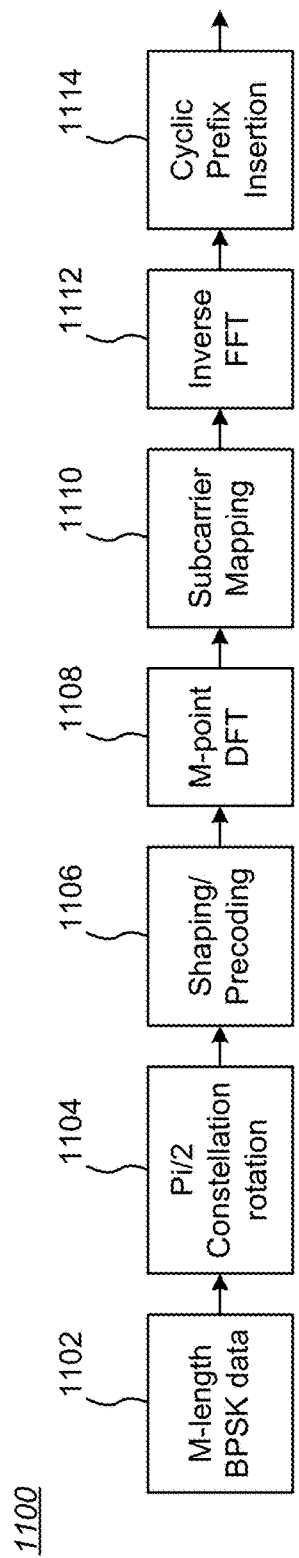
FIG. 11 is a process flowchart of one implementation of a modulation scheme, $\pi/2$-BPSK, defined under the 5G NR standard.

Another application that may benefit from fine-resolution PSD measurements is spectral shaping by a transceiver. For example, FIG. 11 is a process flowchart 1100 of one implementation of a modulation scheme, π/2-BPSK, defined under the 5G NR standard. M-length Binary Phase Shift Keying (BPSK) data (block 1102) is subjected to a π/2 constellation rotation (block 1104), the output of which is applied to a shaping/precoding function (block 1106). Spectrum shaping is applied to π/2-BPSK modulated waveforms to reduce the Peak-to-Average Power Ratio (PAPR) of the signal. Low PAPR transmissions significantly improve cell coverage as they enable high power transmissions without saturating the power amplifier.

After spectrum shaping, an M-point Discrete Fourier Transform (DFT) function is applied (block 1108), subcarrier mapping is performed (block 1110), and Inverse Fast Fourier Transform (IFFT) function is applied (block 1112), and Cyclic Prefix (CP) insertion is performed (block 1114). Greater detail of the functionality of the illustrated modulation scheme may be found, for example, in a paper entitled "*Comparison of π/2 BPSK with and without Frequency Domain Pulse Shaping: Results with PA mode*", document R1-1700849 presented at the 3GPP TSG RAN WG1 AH_NR Meeting in Spokane, Wash., USA January 1620, 2017, and in a paper entitled "*Low PAPR Reference Signal Transceiver Design for 3GPP 5G NR uplink*" by Khan et al. in EURASIP Journal on Wireless Communications and Networking (2020) 2020:182.

Figure 12:
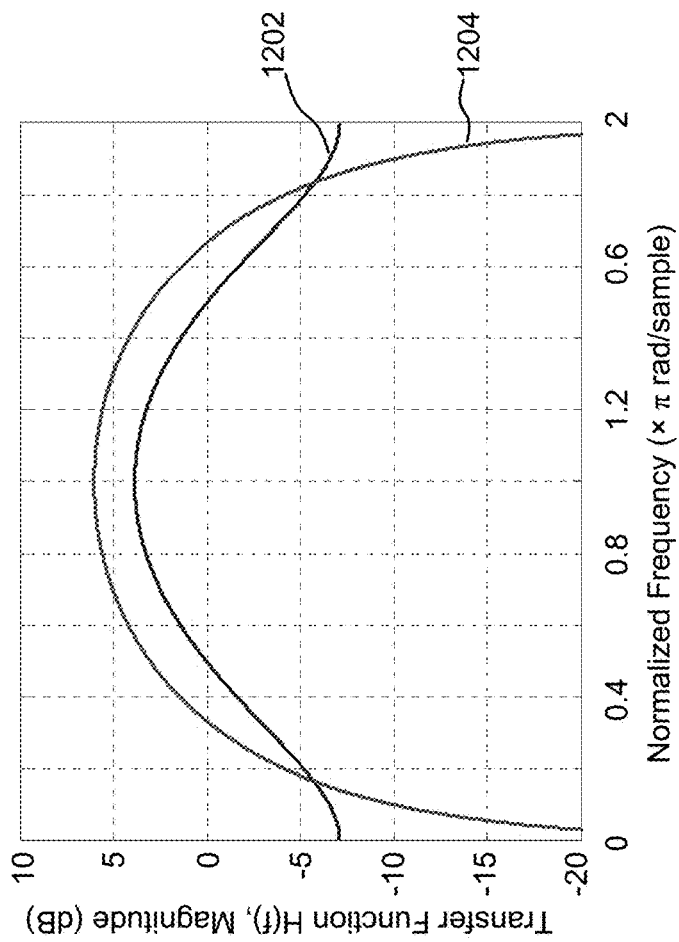
FIG. 12 is a graph showing two possible spectral shaping curves used in the precoder with the shaping/precoding function of FIG. 11, and more specifically, the magnitude of the frequency response (transfer function) of a spectral shaping filter versus normalized frequency expressed in terms of $\times\pi$ radians/sample.

FIG. 12 is a graph showing two possible spectral shaping curves used in the precoder with the shaping/precoding function of FIG. 11, and more specifically, the magnitude of the frequency response (transfer function) of a spectral shaping filter versus normalized frequency expressed in terms of ×π radians/sample. In other words, FIG. 12 shows the magnitude of the Fourier transform of the impulse response of a 2-tap filter and a 3-tap filter in the time domain.

Graph line 1204 represents the transfer function corresponding to a 2-tap filter and the graph line 1202 represents the transfer function corresponding to a 3-tap filter within the shaping/preceding function (block 1106). Applying these transfer functions to the π/2-BPSK modulated waveforms (from block 1104) in the frequency domain shapes the modulated waveforms.

As noted above, the purpose of such spectral shaping/precoding is to reduce the PAPR, thereby reducing the power amplifier (PA) power-backoff needed to operate a local PA in its linear regime before the nonlinear regime and eventual saturation is reached. The result is higher power transmission without saturating the PA. In addition, the more power-backoff, the lower the power added efficiency (PAE) of the PA (i.e., a linearity versus efficiency tradeoff). Better linearity implies better Error Vector Magnitude (EVM) performance.

However, spectral shaping uses up base station margin in comparison to more frequency-uniform signals. If the spectral shaping is too great, the ability of a base station to receive a signal may be broken. Accordingly, verifying that spectral shaping is properly preformed—neither too little nor too much—would be useful to overall communication system performance.

Because spectrum shaping is currently/normally user-equipment (UE) and/or cellular network operator specific and not conveyed to the network, a cellular network control system can use this approach to measure PSD and detect the spectrum shaping actually occurring in the UE.

Circuit Embodiments

Circuits and devices in accordance with the present invention may be used alone or in combination with other components, circuits, and devices. In particular, not shown in FIG. 2 or 8 are possible additional circuit elements, such as amplifiers, attenuators, auxiliary filters (e.g., DC blocking capacitors), that may be useful in particular applications. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit components or blocks (e.g., filters, amplifiers, passive components, and possibly additional ICs) into one package. The ICs and/or modules are then typically combined with other components, often on a printed circuit board, to form part of an end product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless communication.

Calibration of a PSD analysis circuit 200, 800 as a unit, or of just a PSD power detector 204, 802, may be implemented by applying a known waveform and modulation as an input and mapping the output of the PSD power detector 204, 802 as a function of the known input.

Figure 13:
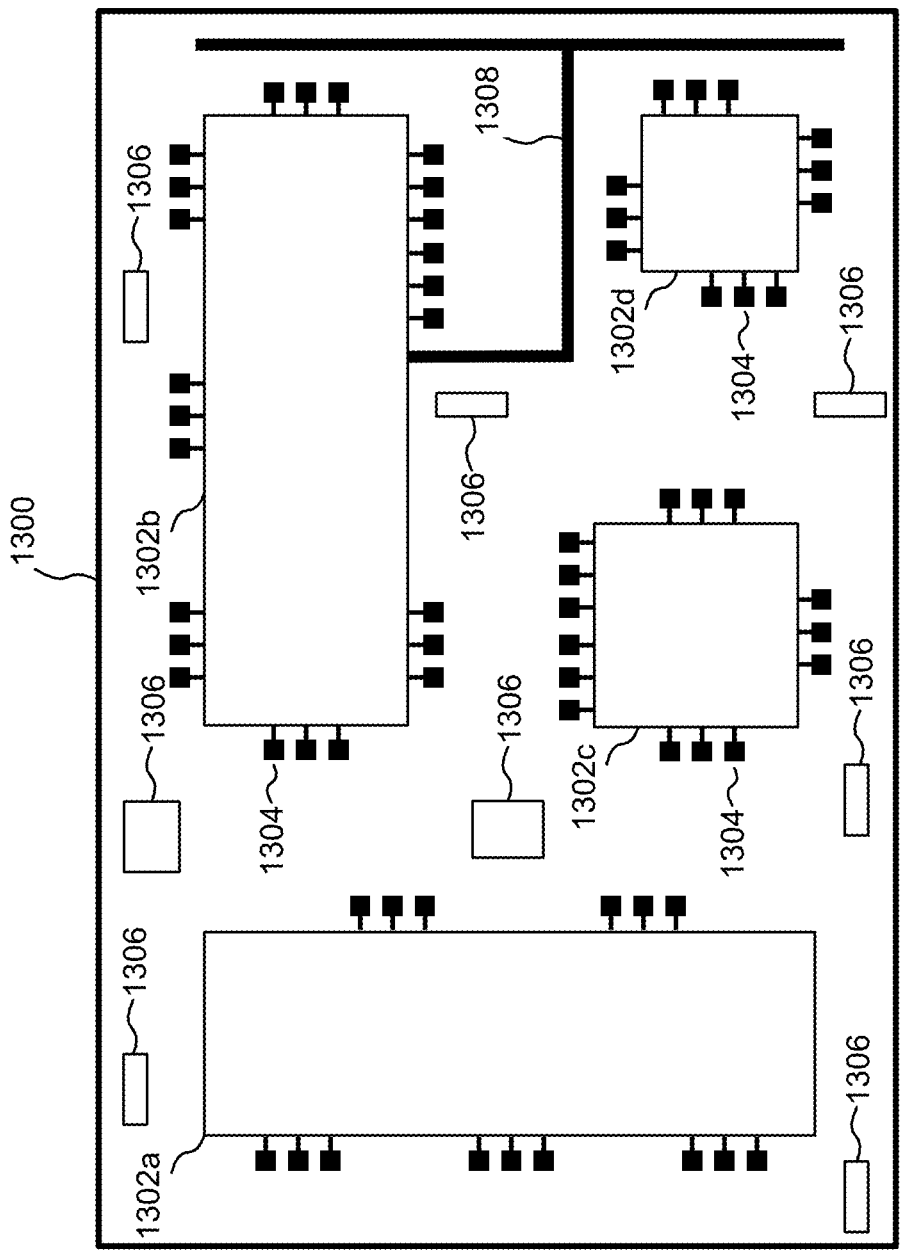
FIG. 13 is a top plan view of a substrate that may be, for example, a printed circuit board or chip module substrate (e.g., a thin-film tile).

As one example of further integration of embodiments of the present invention with other components, FIG. 13 is a top plan view of a substrate 1300 that may be, for example, a printed circuit board or chip module substrate (e.g., a thin-film tile). In the illustrated example, the substrate 1300 includes multiple ICs 1302a-1302d having terminal pads 1304 which would be interconnected by conductive vias and/or traces on and/or within the substrate 1300 or on the opposite (back) surface of the substrate 1300 (to avoid clutter, the surface conductive traces are not shown and not all terminal pads are labelled). The ICs 1302a-1302d may be manufactured using a variety of technologies, such as silicon-on-insulator MOSFETs, and may embody, for example, signal switches, active filters (e.g., including filters based on SAW, BAW, FBAR, XBAR, LVR, LOBAR, and/or HBAR elements), amplifiers (including one or more LNAs), and other circuitry. For example, IC 1302b may incorporate one or more instances of a PSD analysis circuit 200, 800 like the circuits shown in FIG. 2 and/or FIG. 8.

The substrate 1300 may also include one or more passive devices 1306 embedded in, formed on, and/or affixed to the substrate 1300. While shown as generic rectangles, the passive devices 1306 may be, for example, filters, capacitors, inductors, transmission lines, resistors, planar antennae elements, transducers (including, for example, MEMS-based transducers, such as accelerometers, gyroscopes, microphones, pressure sensors, etc.), batteries, etc., interconnected by conductive traces on or in the substrate 1300 to other passive devices 1306 and/or the individual ICs 1302a-1302d.

The front or back surface of the substrate 1300 may be used as a location for the formation of other structures. For example, one or more antennae may be formed on or affixed to the front or back surface of the substrate 1300; one example of a front-surface antenna 1308 is shown, coupled to an IC die 1302b, which may include RF front-end circuitry. Thus, by including one or more antennae on the substrate 1300, a complete radio may be created.

System Aspects

Embodiments of the present invention are useful in a wide variety of larger radio frequency (RF) circuits and systems for performing a range of functions, including (but not limited to) impedance matching circuits, RF power amplifiers, RF low-noise amplifiers (LNAs), phase shifters, attenuators, antenna beam-steering systems, charge pump devices, RF switches, etc. Such functions are useful in a variety of applications, such as radar systems (including phased array and automotive radar systems), radio systems (including cellular radio systems), and test equipment.

Radio system usage includes wireless RF systems (including base stations, relay stations, and hand-held transceivers) that use various technologies and protocols, including various types of orthogonal frequency-division multiplexing ("OFDM"), quadrature amplitude modulation ("QAM"), Code-Division Multiple Access ("CDMA"), Time-Division Multiple Access ("TDMA"), Wide Band Code Division Multiple Access ("W-CDMA"), Global System for Mobile Communications ("GSM"), Long Term Evolution ("LTE"), 5G NR, 6G, and WiFi (e.g., 802.11a, b, g, ac, ax, be), as well as other radio communication standards and protocols.

Figure 14:
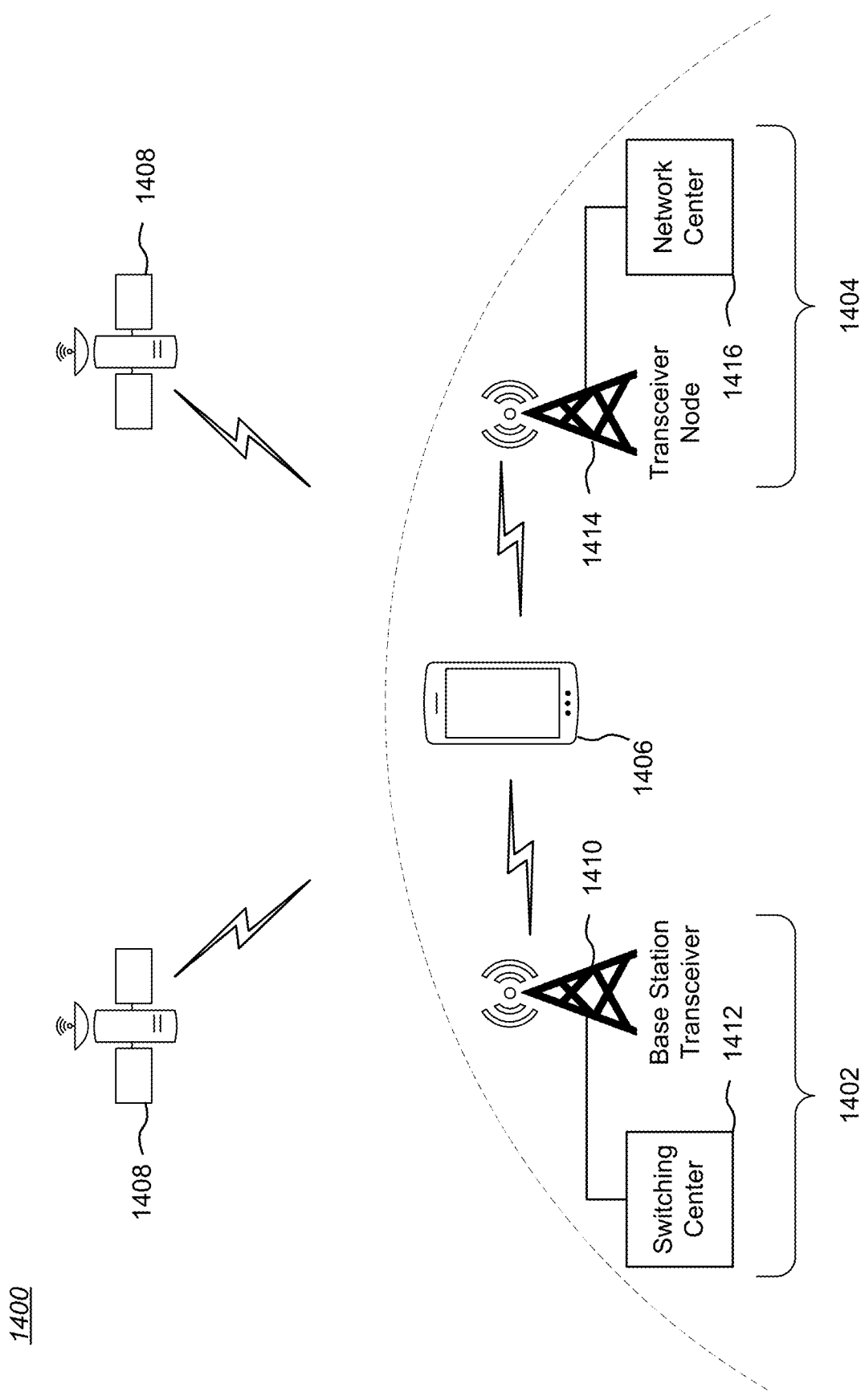
FIG. 14 illustrates an exemplary prior art wireless communication environment 1400 comprising different wireless communication systems, and which may include one or more mobile wireless devices.

As an example of wireless RF system usage, FIG. 14 illustrates an exemplary prior art wireless communication environment 1400 comprising different wireless communication systems 1402 and 1404, and which may include one or more mobile wireless devices 1406.

A wireless device 1406 may be capable of communicating with multiple wireless communication systems 1402, 1404 using one or more of the telecommunication protocols noted above. A wireless device 1406 also may be capable of communicating with one or more satellites 1408, such as navigation satellites (e.g., GPS) and/or telecommunication satellites. The wireless device 1406 may be equipped with multiple antennas, externally and/or internally, for operation on different frequencies and/or to provide diversity against deleterious path effects such as fading and multi-path interference. A wireless device 1406 may be a cellular phone, a personal digital assistant (PDA), a wireless-enabled computer or tablet, connected wearables (e.g. a smart watch), or some other wireless communication unit or device. A wireless device 1406 may also be referred to as a mobile station, user equipment, an access terminal, or some other terminology.

The wireless system 1402 may be, for example, a CDMA-based system that includes one or more base station transceivers (BSTs) 1410 and at least one switching center (SC) 1412. Each BST 1410 provides over-the-air RF communication for wireless devices 1406 within its coverage area. The SC 1412 couples to one or more BSTs in the wireless system 1402 and provides coordination and control for those BSTs.

The wireless system 1404 may be, for example, a TDMA-based system that includes one or more transceiver nodes 1414 and a network center (NC) 1416. Each transceiver node 1414 provides over-the-air RF communication for wireless devices 1406 within its coverage area. The NC 1416 couples to one or more transceiver nodes 1414 in the wireless system 1404 and provides coordination and control for those transceiver nodes 1414.

In general, each BST 1410 and transceiver node 1414 is a fixed station that provides communication coverage for wireless devices 1406, and may also be referred to as base stations or some other terminology. The SC 1412 and the NC 1416 are network entities that provide coordination and control for the base stations and may also be referred to by other terminologies.

Figure 15:
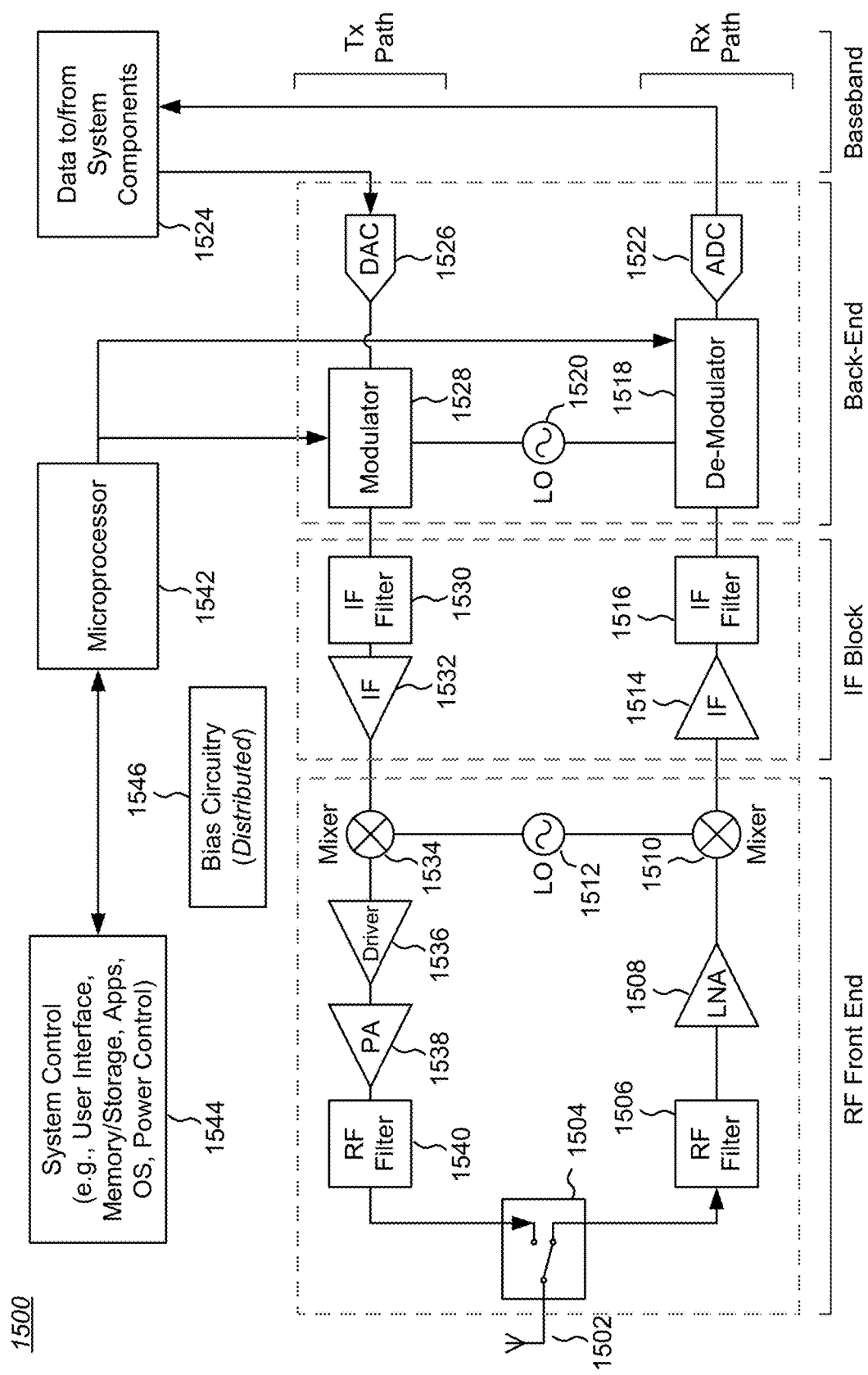
FIG. 15 is a block diagram of a transceiver that might be used in a wireless device, such as a cellular telephone, and which may beneficially incorporate an embodiment of the present invention for improved performance.

An important aspect of any wireless system, including the systems shown in FIG. 14, is in the details of how the component elements of the system perform. FIG. 15 is a block diagram of a transceiver 1500 that might be used in a wireless device, such as a cellular telephone, and which may beneficially incorporate an embodiment of the present invention for improved performance. As illustrated, the transceiver 1500 includes a mix of RF analog circuitry for directly conveying and/or transforming signals on an RF signal path, non-RF analog circuitry for operational needs outside of the RF signal path (e.g., for bias voltages and switching signals), and digital circuitry for control and user interface requirements. In this example, a receiver path Rx includes RF Front End, IF Block, Back-End, and Baseband sections (noting that in some implementations, the differentiation between sections may be different).

The receiver path Rx receives over-the-air RF signals through an antenna 1502 and a switching unit 1504, which may be implemented with active switching devices (e.g., field effect transistors or FETs) and/or with passive devices that implement frequency-domain multiplexing, such as a diplexer or duplexer. An RF filter 1506 passes desired received RF signals to a low noise amplifier (LNA) 1508, the output of which is combined in a mixer 1510 with the output of a first local oscillator 1512 to produce an intermediate frequency (IF) signal.

The IF signal may be amplified by an IF amplifier 1514 and subjected to an IF filter 1516 before being applied to a demodulator 1518, which may be coupled to a second local oscillator 1520. The demodulated output of the demodulator 1518 is transformed to a digital signal by an analog-to-digital converter 1522 and provided to one or more system components 1524 (e.g., a video graphics circuit, a sound circuit, memory devices, etc.). The converted digital signal may represent, for example, video or still images, sounds, or symbols, such as text or other characters.

In the illustrated example, a transmitter path Tx includes Baseband, Back-End, IF Block, and RF Front End sections (again, in some implementations, the differentiation between sections may be different). Digital data from one or more system components 1524 is transformed to an analog signal by a digital-to-analog converter 1526, the output of which is applied to a modulator 1528, which also may be coupled to the second local oscillator 1520. The modulated output of the modulator 1528 may be subjected to an IF filter 1530 before being amplified by an IF amplifier 1532. The output of the IF amplifier 1532 is then combined in a mixer 1534 with the output of the first local oscillator 1512 to produce an RF signal. The RF signal may be amplified by a driver 1536, the output of which is applied to a power amplifier (PA) 1538. The amplified RF signal may be coupled to an RF filter 1540, the output of which is coupled to the antenna 1502 through the switching unit 1504.

The operation of the transceiver 1500 is controlled by a microprocessor 1542 in known fashion, which interacts with system control components 1544 (e.g., user interfaces, memory/storage devices, application programs, operating system software, power control, etc.). In addition, the transceiver 1500 will generally include other circuitry, such as bias circuitry 1546 (which may be distributed throughout the transceiver 1500 in proximity to transistor devices), electrostatic discharge (ESD) protection circuits, testing circuits (not shown), factory programming interfaces (not shown), etc.

In modern transceivers, there are often more than one receiver path Rx and transmitter path Tx, for example, to accommodate multiple frequencies and/or signaling modalities. Further, as should be apparent to one of ordinary skill in the art, some components of the transceiver 1500 may be positioned in a different order (e.g., filters) or omitted.

Other components can be (and usually are) added (e.g., additional filters, impedance matching networks, variable phase shifters/attenuators, power dividers, etc.). Notably, one or more instances of a PSD analysis circuit 200, 800 may be coupled to the RF signal (e.g., within the RF Front End) so as to measure the PSD of an outgoing RF transmission signal or an incoming RF reflection signal, and the resulting analog signal or digital data may be coupled to the microprocessor 1542 or other system control circuitry.

The measured analog signal or digital data output allows verification of transmission signal quality and spurious received levels autonomously—that is, without substantially affecting other RF transmission or reception circuitry—and is not reliant on numerical approximations or performance assumptions of an RF system. By enabling fine-resolution measurements of PSD, embodiments of the current invention improve communication system performance in terms of higher data rates, lower power with increased efficiency, and greater reliability of communications.

Methods

Figure 16:
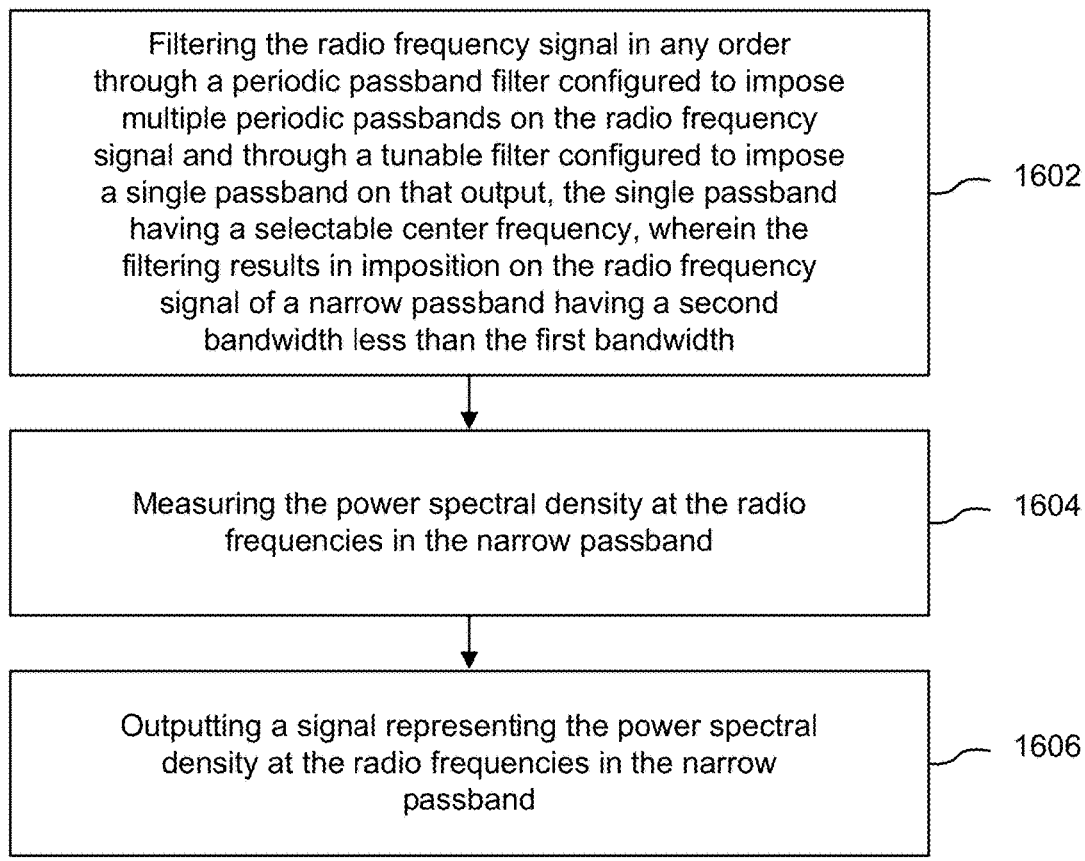
FIG. 16 is a process flow chart showing one method for determining a fine-resolution power spectral density of a radio frequency signal having a first bandwidth.

Another aspect of the invention includes methods for determining a fine-resolution power spectral density of a radio frequency signal. For example, FIG. 16 is a process flow chart 1600 showing one method for determining a fine-resolution power spectral density of a radio frequency signal having a first bandwidth. The method includes: filtering the radio frequency signal in any order through a periodic passband filter configured to impose multiple periodic passbands on the radio frequency signal and through a tunable filter configured to impose a single passband on that output, the single passband having a selectable center frequency, wherein the filtering results in imposition on the radio frequency signal of a narrow passband having a second bandwidth less than the first bandwidth [Block 1602]; measuring the power spectral density at the radio frequencies in the narrow passband [Block 1604]; and outputting a signal representing the power spectral density at the radio frequencies in the narrow passband [Block 1606].

Additional aspects of the above method may include one or more of the following: wherein the periodic passband filter is a passive low-insertion loss radio frequency filter; and/or wherein the periodic passband filter is based on a lateral overtone acoustic bulk resonator.

Fabrication Technologies & Options

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

With respect to the figures referenced in this disclosure, the dimensions for the various elements are not to scale; some dimensions have been greatly exaggerated vertically and/or horizontally for clarity or emphasis. In addition, references to orientations and directions (e.g., "top", "bottom", "above", "below", "lateral", "vertical", "horizontal", etc.) are relative to the example drawings, and not necessarily absolute orientations or directions.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as bipolar, BiCMOS, LDMOS, BCD, GaAs HBT, GaN HEMT, GaAs pHEMT, and MESFET technologies. Embodiments may include SAW, BAW, FBAR, XBASR, LVR, LOBAR, and/or HBAR filter elements. Embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 300 GHz). Monolithic IC implementation is particularly useful since parasitic capacitances generally can be kept low (or at a minimum, kept uniform across all units, permitting them to be compensated) by careful design.

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

CONCLUSION

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A power spectral density power detector including:
   (a) a narrow-band tunable filter configured to receive a radio frequency signal having a first bandwidth and impose on the received radio frequency signal a narrow passband having a second bandwidth less than the first bandwidth, the narrow-band tunable filter including:
      (1) a periodic passband filter; and
      (2) a tunable filter coupled in series with the periodic passband filter; and
   (b) a power detection circuit coupled to the narrow-band tunable filter and configured to receive a range of radio frequencies in the narrow passband and output a signal representing the power spectral density at a range of radio frequencies in the narrow passband.

2. The invention of claim 1, wherein the periodic passband filter is configured to impose multiple periodic passbands on the received radio frequency signal.

3. The invention of claim 2, wherein the periodic passband filter is a passive low-insertion loss radio frequency filter.

4. The invention of claim 2, wherein the periodic passband filter is based on a lateral overtone acoustic bulk resonator.

5. The invention of claim 1, wherein the tunable filter includes a switched bank of fixed filters having similar passband characteristics but with different center frequencies.

6. The invention of claim 1, wherein the tunable filter is configured to impose a single passband on the received radio frequency signal, the single passband having a selectable center frequency.

7. The invention of claim 1, wherein the periodic passband filter is configured to impose multiple periodic passbands on the received radio frequency signal, and the tunable filter is configured to impose a single passband on the received radio frequency signal, the single passband having a selectable center frequency.

8. The invention of claim 7, wherein the narrow passband is a result of superimposition of the single passband from the tunable filter and the multiple periodic passbands from the periodic passband filter.

9. The invention of claim 1, wherein the power detection circuit includes a logarithmic detector.

10. The invention of claim 1, wherein the signal output by the power detection circuit is an analog signal.

11. The invention of claim 1, wherein the signal output by the power detection circuit is digital data.

12. The invention of claim 1, further including a signal coupler configured to receive an input radio frequency signal and couple at least a portion of the input radio frequency signal to the narrow-band tunable filter as the received radio frequency signal having the first bandwidth.

13. The invention of claim 1, further including a signal coupler configured to receive an input radio frequency signal at an input port and couple at least a portion of the input radio frequency signal through a coupled port to the narrow-band tunable filter as the received radio frequency signal having the first bandwidth.

14. The invention of claim 1, further including a signal coupler configured to receive an input radio frequency signal at an input port, receive a reflected frequency signal at an output port, and couple at least a portion of the received reflected radio signal through an isolated port to the narrow-band tunable filter as the received radio frequency signal having the first bandwidth.

15. A power spectral density analysis circuit including:
   (a) a signal coupler having an input port, an output port, a coupled port, and an isolated port, the signal coupler configured to receive, at the input port, a radio frequency signal having a first bandwidth, and to output, at the coupled port, at least a portion of the input radio frequency signal;

(b) a narrow-band tunable filter coupled to the coupled port of the signal coupler and configured to receive the portion of the input radio frequency signal and impose a narrow passband having a second bandwidth less than the first bandwidth, the narrow-band tunable filter including:
  (1) a periodic passband filter; and
  (2) a tunable filter coupled in series with the periodic passband filter; and (c) a power detection circuit coupled to the narrow-band tunable filter and configured to receive a range of radio frequencies in the narrow passband and output a signal representing the power spectral density at a range of radio frequencies in the narrow passband.

16. The invention of claim 15, wherein the periodic passband filter is configured to impose multiple periodic passbands on the received portion of the input radio frequency signal.

17. The invention of claim 16, wherein the periodic passband filter is a passive low-insertion loss radio frequency filter.

18. The invention of claim 16, wherein the periodic passband filter is based on a lateral overtone acoustic bulk resonator.

19. The invention of claim 15, wherein the tunable filter includes a switched bank of fixed filters having similar passband characteristics but with different center frequencies.

20. The invention of claim 15, wherein the tunable filter is configured to impose a single passband on the received portion of the input radio frequency signal, the single passband having a selectable center frequency.

21. The invention of claim 15, wherein the periodic passband filter is configured to impose multiple periodic passbands on the received portion of the input radio frequency signal, and the tunable filter is configured to impose a single passband on the received portion of the input radio frequency signal, the single passband having a selectable center frequency.

22. The invention of claim 21, wherein the narrow passband is a result of superimposition of the single passband from the tunable filter and the multiple periodic passbands from the periodic passband filter.

23. The invention of claim 15, wherein the power detection circuit includes a logarithmic detector.

24. The invention of claim 15, wherein the signal output by the power detection circuit is an analog signal.

25. The invention of claim 15, wherein the signal output by the power detection circuit is digital data.

* * * * *